(12) United States Patent
Rowlands

(10) Patent No.: US 7,114,043 B2
(45) Date of Patent: Sep. 26, 2006

(54) AMBIGUOUS VIRTUAL CHANNELS

(75) Inventor: Joseph B. Rowlands, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 374 days.

(21) Appl. No.: 10/434,921

(22) Filed: May 9, 2003

(65) Prior Publication Data

US 2003/0217235 A1   Nov. 20, 2003

Related U.S. Application Data

(60) Provisional application No. 60/380,740, filed on May 15, 2002.

(51) Int. Cl.
*G06F 12/00* (2006.01)

(52) U.S. Cl. .................... 711/154; 710/36; 710/306
(58) Field of Classification Search ................ 711/154, 711/146; 710/36, 38, 39, 306
See application file for complete search history.

(56) References Cited

U.S. PATENT DOCUMENTS

| | | |
|---|---|---|
| 4,433,378 A | 2/1984 | Leger |
| 4,463,424 A | 7/1984 | Mattson et al. |
| 4,760,571 A | 7/1988 | Schwarz |
| 5,640,399 A | 6/1997 | Rostoker et al. |
| 5,668,809 A | 9/1997 | Rostoker et al. |
| 5,778,414 A | 7/1998 | Winter et al. |
| 5,802,287 A | 9/1998 | Rostoker et al. |
| 5,829,025 A | 10/1998 | Mittal |
| 5,887,187 A | 3/1999 | Rostoker et al. |
| 5,893,150 A | 4/1999 | Hagersten et al. |
| 5,908,468 A | 6/1999 | Hartmann |
| 5,914,955 A | 6/1999 | Rostoker et al. |
| 5,974,508 A | 10/1999 | Maheshwari |
| 6,018,763 A | 1/2000 | Hughes et al. |
| 6,021,451 A | 2/2000 | Bell et al. |
| 6,092,137 A | 7/2000 | Huang et al. |
| 6,098,064 A | 8/2000 | Pirolli et al. |
| 6,111,859 A | 8/2000 | Godfrey et al. |
| 6,151,662 A | 11/2000 | Christie et al. |
| 6,157,623 A | 12/2000 | Kerstein |
| 6,202,125 B1 | 3/2001 | Patterson et al. |
| 6,202,129 B1 | 3/2001 | Palanca et al. |
| 6,209,020 B1 | 3/2001 | Angle et al. |
| 6,215,497 B1 | 4/2001 | Leung |

(Continued)

FOREIGN PATENT DOCUMENTS

WO   WO 00/30322   5/2000

(Continued)

OTHER PUBLICATIONS

Linder, et al., "An Adaptive and Fault Tolerant Wormhole Routing Strategy for k-ary n-cubes", © 1991 IEEE, p. 2-12.*

(Continued)

*Primary Examiner*—Brian R. Peugh
(74) *Attorney, Agent, or Firm*—Garlick Harrison & Markison

(57) ABSTRACT

An apparatus comprises a first plurality of buffers configured to store operations belonging to a first virtual channel and a control circuit coupled to the first plurality of buffers. The first virtual channel includes first operations and second operations, wherein each of the first operations depend on at least one of the second operations during use. A first number of the first operations is less than or equal to a maximum. It is ambiguous, for a first received operation in the first virtual channel, whether the first received operation is one of the first operations or the second operations. A total number of the first plurality of buffers exceeds the maximum.

19 Claims, 14 Drawing Sheets

U.S. PATENT DOCUMENTS

| | | |
|---|---|---|
| 6,262,594 B1 | 7/2001 | Cheung et al. |
| 6,266,797 B1 | 7/2001 | Godfrey et al. |
| 6,269,427 B1 | 7/2001 | Kuttanna et al. |
| 6,279,087 B1 | 8/2001 | Melo et al. |
| 6,321,309 B1 | 11/2001 | Bell et al. |
| 6,332,179 B1 | 12/2001 | Okpisz et al. |
| 6,349,365 B1 | 2/2002 | McBride |
| 6,366,583 B1 | 4/2002 | Rowett et al. |
| 6,373,846 B1 | 4/2002 | Daniel et al. |
| 6,438,651 B1 | 8/2002 | Slane |
| 6,574,708 B1 | 6/2003 | Hayter et al. |
| 2004/0066758 A1* | 4/2004 | Van Doren et al. ......... 370/329 |
| 2004/0068616 A1* | 4/2004 | Tierney et al. ............ 711/141 |

FOREIGN PATENT DOCUMENTS

| | | |
|---|---|---|
| WO | WO 00/52879 | 9/2000 |

OTHER PUBLICATIONS

Dally et al., "Deadlock-Free Adaptive Routing in Multicomputer Networks Using Virtual Channels", © IEEE, p. 466-475.*

Duato, "A Theory of Deadlock-Free Adaptive Multicast Routing in Wormhole Networks", © 1995 IEEE, p. 976-987.*

U.S. Appl. No. 09/680,524; filed Oct. 6, 2000; Rowlands et al.; "Source Triggered Transaction Blocking".

U.S. Appl. No. 09/829,514; filed Apr. 9, 2001; Kruckemyer et al.; "Cache Coherent Protocol In Which Exclusive . . . ".

U.S. Appl. No. 10/413,917; filed Apr. 15, 2003; Rowlands et al.; "Cache Programmable To Partition Ways To Agents . . . ".

U.S. Appl. No. 10/269,922; filed Oct. 11, 2002; Sano et al.; "Systems Using Mix of Packet, Coherent,and Noncoherent . . . ".

U.S. Appl. No. 10/270,028; filed Oct. 11, 2002; Rowlands; "System Having Interfaces, Switch, And Memory Bridge . . . ".

U.S. Appl. No. 10/269,827; filed Oct. 11, 2002; Rowlands et al.; "Remote Line Directory Which Covers Subset of . . . ".

U.S. Appl. No. 10/269,828; filed Oct. 11, 2002; Rowlands; "L2 Cache Maintaining Local Ownership Of . . . ".

U.S. Appl. No. 10/270,480; filed Oct. 11, 2002; Rowlands; "System Having Address-Based Intranode Coherency and . . . ".

SiByte; "Target Applications" http://sibyte.com/mercurian.applications.htm; Jan. 15, 2001; 2 pages.

SiByte; "SiByte Technology" http://sibyte.com/mercurian/technology.htm; Jan. 15, 2001; 3 pages.

SiByte; "The Mercurian Processor" http://sibyte.com/mercurian; Jan. 15, 2001; 2 pages.

SiByte; "Fact Sheet, SB-1 CPU" Oct. 2000; 1 page.

SiByte; "Fact Sheet, SB-1250" Oct. 2000; 10 pages.

Stepanian; "SiByte SB-1 MIPS64 CPU Core" Embedded Processor Forum 2000; Jun. 13, 2000, 15 pages.

Keller; "The Mercurian Processor: A High Performance, Power-efficient CMP for Networking" Oct. 10, 2000; 22 pages.

Saulsbury et al.; "An Argument for Simple COMA" SICS Research Report No.: R94:15; Aug. 1, 1994; 20 pages.

Lenoski; "The Design And Analysis Of Dash: A Scalable Directory-Based Multiprocessor" Dissertation-Stanford University; Dec. 1991; 176 pages.

"21143 PCI/Card Bus 10/100Mb/s Ethernet LAN Controller" Hardware Reference Manual; Intel Corp.; Oct. 1998.

"Pentium Pro Family Developer's Manual, vol. 1: Specifications" Intel Corporation; 1996; pp. 4-1 to 4-18.

"PowerPC 601, RISC Microprocessor User's Manual" MPC601UM/AD; 1993; 1 page.

"Pentium Processor Family User's Manual, vol. 1: Pentium Processor Family Data Book"; Intel Corp.; 1994; 2 pages.

Katevenis et al.; "ATLAS I: a single-chip, gigabit ATM switch with HIC/HS links and multi-lane back-pressure" Microprocessors and Microsystems; 1998; pp. 481-490.

Halfhill; "SiByte Reveals 64-Bit Core For NPUs, Independent MIPS64 Design Combines Low Power, High Performance" Microdesign Resources; Jun. 2000, 4 pages.

U.S. Appl. No. 09/680,524;filed Oct. 6, 2000; Rowlands et al.; "Source Triggered Transaction Blocking."

U.S. Appl. No. 09/829, 514; filed Apr. 9, 2001; Kruckemyer et al.; "Cache Coherent Protocol In Which Exclusive..."

U.S. Appl. No. 10/413,917; filed Apr. 15, 2003; Rowlands et al.; "Cache Programmable To Partition Ways To Agents..."

U.S. Appl. No. 10/269,922; filed Oct. 11, 2002; Sano et al.; "Systems Using Mix of Packet, Coherent, and NonCoherent..."

U.S. Appl. No. 10/270,028; filed Oct. 11, 2002; Rowlands; "System Having Interfaces, Switch, And Memory Bridge..."

U.S. Appl. No. 10/269,827; filed Oct. 11, 2002; Rowlands et al; "Remote Line Directory Which Covers Subset of..."

U.S. Appl. No. 10/269,828; filed Oct 11, 2002; Rowlands; "L2 Cache Maintaining Local Ownership Of..."

U.S. Appl. No. 10/270,480; filed Oct. 11, 2002; Rowlands; "System Having Address-Based Intranode Coherency and..."

* cited by examiner

Interconnect Transactions

| Transaction |
|---|
| RdShd |
| RdExc |
| Wr |
| WrInv |
| RdKill |
| RdInv |
| WrFlush |
| Nop |

— 42

HTcc Commands

| Command | Virtual Channel |
|---|---|
| cRdShd | CRd |
| cRdExc | CRd |
| Flush | Probe |
| Kill | Probe |
| Kill_Ack | Ack |
| WB | Ack |
| Fill | CFill |

AMBIGUOUS VIRTUAL CHANNELS

This application claims benefit of priority to U.S. Provisional Patent Application Ser. No. 60/380,740, filed May 15, 2002.

BACKGROUND OF THE INVENTION

1. Field of the Invention

This invention is related to the field of deadlock prevention in communications between coherent agents in a distributed coherent system.

2. Description of the Related Art

In various systems in which multiple agents may initiate operations, system deadlock is a possibility. Particularly, operations may be part of a complex set of operations required to complete a communication between agents in the system. In such cases, the operations may have various dependencies on one another, requiring operations to be able to bypass one another at the communication medium to complete the overall communication. If the bypassing is not possible, deadlock may occur. Thus, mechanisms to prevent deadlock are needed.

One mechanism used to prevent deadlock is virtual channels. A virtual channel may be though of as an abstract connection over a communication medium. Each virtual channel used on the communication medium is defined to flow over the communication medium logically independent of the other virtual channels on that communication medium. For example, buffers on each side of the communication medium may be defined for the virtual channels, and separate (independent) flow controls may be used for each virtual channel. Thus, if one virtual channel is blocked (e.g. due to a lack of receiving buffers on the other end of the communication medium, or for some logical reason such as a protocol requirement or dependency), other virtual channels may still communicate over the communication medium. In some cases, a given virtual channel may be implemented as a separate physical communication medium. In other cases, however, virtual channels may share at least a portion of a communication medium between a source and a destination.

By assigning operations that may have dependencies on each other to separate virtual channels, the operations may be permitted to occur in the correct order since the virtual channels may not block each other due to physical or resource constraints. That is, if a first operation is stalled due to a dependency on a second operation, the fact that the second operation is in a different virtual channel than the first operation ensures that the second operation will not be blocked from transmission by the first operation.

In some cases, false dependencies between operations may occur. For example, such false dependencies may occur if there is ambiguity as to the dependency (or lack thereof). If ambiguity may not be resolved at the time an operation is to be placed in a virtual channel, then a false dependency may be created to ensure that the coherency mechanism works correctly for either resolution of the ambiguity. The dependency is false if the dependency is created (to resolve the ambiguity) but in reality the dependency does not exist. False dependencies may lead to deadlock in the system even with the use of virtual channels.

SUMMARY OF THE INVENTION

In one embodiment, an apparatus comprises a first plurality of buffers configured to store operations belonging to a first virtual channel during use and a control circuit coupled to the first plurality of buffers. The first virtual channel includes first operations and second operations, wherein each of the first operations depend on at least one of the second operations during use. A first number of the first operations is less than or equal to a maximum. The control circuit is configured to control allocation and deallocation of the first plurality of buffers. It is ambiguous, for a first received operation in the first virtual channel, whether the first received operation is one of the first operations or the second operations. A total number of the first plurality of buffers exceeds the maximum.

In some implementations, the apparatus further includes a second buffer or buffers configured to store operations belonging to a second virtual channel during use. In at least some cases, a first operation in the first virtual channel is dependent on a third operation in the second virtual channel, and the third operation is further dependent on one of the second operations, whereby the first operation is dependent on one of the second operations. In some cases, the dependency may be a false dependency.

In some implementations, the apparatus may be a processor. In such an implementation, the second buffers may be read buffers and the first plurality of buffers may be snoop buffers. In some other implementations, the apparatus may be a memory bridge. In such an implementation, the second buffers may be coherent read buffers and the first plurality of buffers may be acknowledge buffers.

In another embodiment, a cache is contemplated. The cache comprises a cache memory; one or more read buffers configured to store read operations for the cache memory; one or more write buffers configured to store write operations for the cache memory; and a control circuit coupled to the write buffers. In response to a hit of a probe on a first write operation in the write buffers, the control circuit is configured to change a state of the first write operation to invalid.

A method is contemplated. A first virtual channel to which first operations belong is merged with a second virtual channel to which second operations belong, creating a merged virtual channel. At least some of the first operations have a dependency on one or more of the second operations during use. A number of he first operations having the dependency is less than or equal to a maximum. It is ambiguous whether a received operation is one of the first operations or the second operations. A number of buffers are provided for the merged virtual channel, wherein the number exceeds the maximum.

BRIEF DESCRIPTION OF THE DRAWINGS

The following detailed description makes reference to the accompanying drawings, which are now briefly described.

FIG. 2 is a table illustrating an exemplary set of coherency commands and a table illustrating an exemplary set of transactions according to one embodiment of the node shown in FIG. 1.

Figure 1:
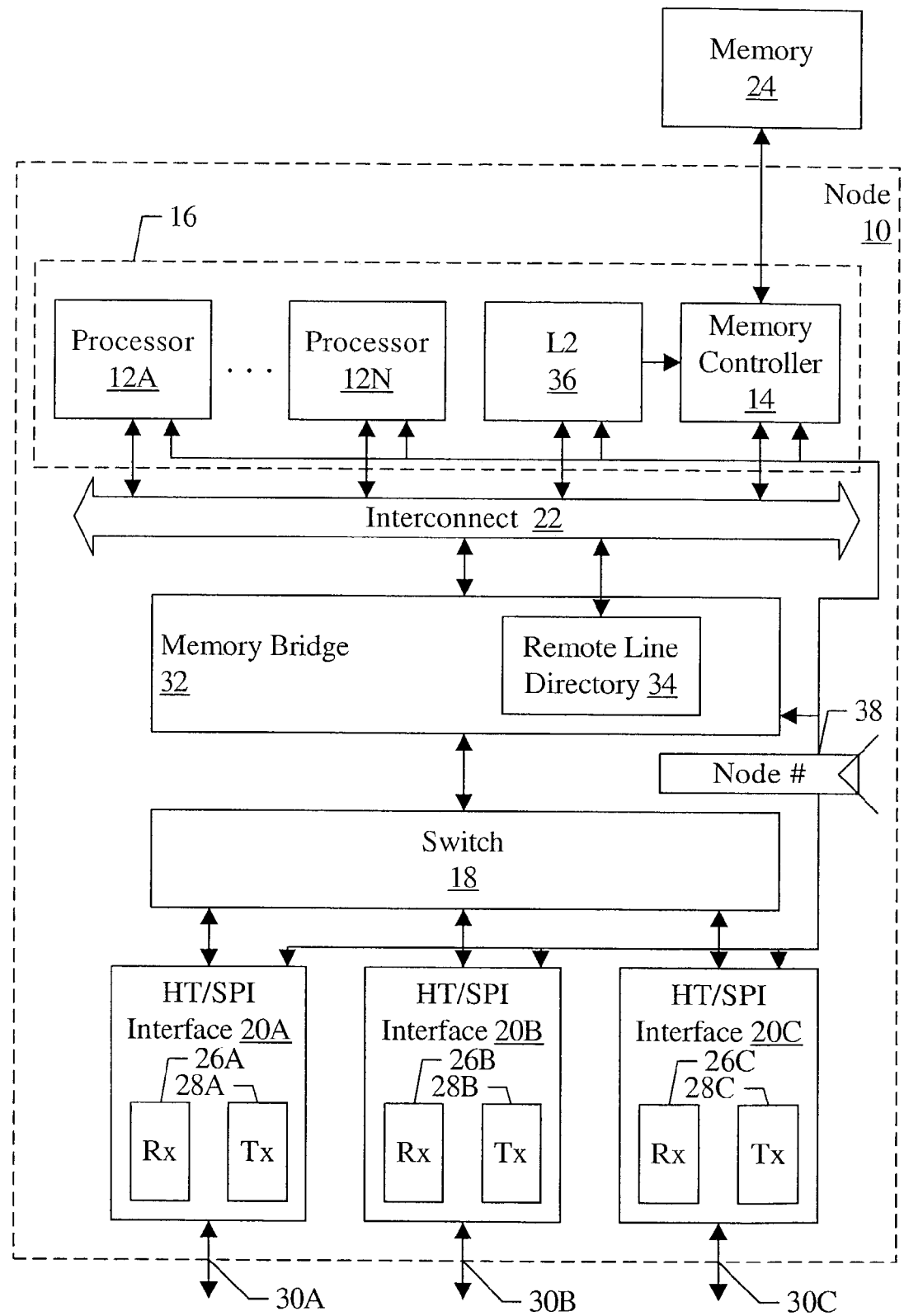
FIG. 1 is a block diagram of one embodiment of a node.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Node Overview

Turning now to FIG. 1, a block diagram of one embodiment of a node 10 is shown. In the embodiment of FIG. 1, the node 10 includes one or more processors 12A–12N, a memory controller 14, a switch 18, a set of interface circuits 20A–20C, a memory bridge 32, and an L2 cache 36. The memory bridge 32 includes a remote line directory 34. The node 10 includes an interconnect 22 to which the processors 12A–12N, the memory controller 14, the L2 cache 36, the memory bridge 32, and the remote line directory 34 are coupled. The node 10 is coupled, through the memory controller 14, to a memory 24. The interface circuits 20A–20C each include a receive (Rx) circuit 26A–26C and a transmit (Tx) circuit 28A–28C. The node 10 is coupled to a set of interfaces 30A–30C through respective interface circuits 20A–20C. The interface circuits 20A–20C are coupled to the switch 18, which is further coupled to the memory bridge 32. A configuration register 38 is also illustrated in FIG. 1, which stores a node number (Node #) for the node 10. The configuration register 38 is coupled to the L2 cache 36, the memory controller 14, the memory bridge 32, and the interface circuits 20A–20C in the embodiment of FIG. 1. Additionally, the processors 12A–12N may be coupled to receive the node number from the configuration register 38.

The node 10 may support intranode coherency for transactions on the interconnect 22. Additionally, the node 10 may support internode coherency with other nodes (e.g. a CC-NUMA coherency, in one embodiment). Generally, as used herein, a memory bridge includes circuitry designed to handle internode coherency functions within a node. Particularly, in one embodiment, if a transaction on the interconnect 22 (e.g. a transaction issued by the processors 12A–12N) accesses a cache block that is remote to the node 10 (i.e. the cache block is part of the memory coupled to a different node) and the node 10 does not have sufficient ownership to perform the transaction, the memory bridge 32 may issue one or more coherency commands to the other nodes to obtain the ownership (and a copy of the cache block, in some cases). Similarly, if the transaction access a local cache block but one or more other nodes have a copy of the cache block, the memory bridge 32 may issue coherency commands to other nodes. Still further, the memory bridge 32 may receive coherency commands from other nodes, and may perform transactions on the interconnect 22 to effect the coherency commands.

In one embodiment, a node such as node 10 may have memory coupled thereto (e.g. memory 24). The node may be responsible for tracking the state, in other nodes, of each cache block from the memory in that node. A node is referred to as the "home node" for cache blocks from the memory assigned to that node. A node is referred to as a "remote node" for a cache block if the node is not the home node for that cache block. Similarly, a cache block is referred to as a local cache block in the home node for that cache block and as a remote cache block in other nodes.

Generally, a remote node may begin the coherency process by requesting a copy of a cache block from the home node of that cache block using a coherency command. The memory bridge 32 in the remote node, for example, may detect a transaction on the interconnect 22 that accesses the cache block and may detect that the remote node does not have sufficient ownership of the cache block to complete the transaction (e.g. it may not have a copy of the cache block at all, or may have a shared copy and may require exclusive ownership to complete the transaction). The memory bridge 32 in the remote node may generate and transmit the coherency command to the home node to obtain the copy or to obtain sufficient ownership. The memory bridge 32 in the home node may determine if any state changes in other nodes are to be performed to grant the requested ownership to the remote node, and may transmit coherency commands (e.g. probe commands) to effect the state changes. The memory bridge 32 in each node receiving the probe commands may effect the state changes and respond to the probe commands. Once the responses have been received, the memory bridge 32 in the home node may respond to the remote node (e.g. with a fill command including the cache block).

The remote line directory 34 may be used in the home node to track the state of the local cache blocks in the remote nodes. The remote line directory 34 is updated each time a cache block is transmitted to a remote node, the remote node returns the cache block to the home node, or the cache block is invalidated via probes. As used herein, the "state" of a cache block in a given node refers to an indication of the ownership that the given node has for the cache block according to the coherency protocol implemented by the nodes. Certain levels of ownership may permit no access, read-only access, or read-write access to the cache block. For example, in one embodiment, the modified, shared, and invalid states are supported in the internode coherency protocol. In the modified state, the node may read and write the cache block and the node is responsible for returning the block to the home node if evicted from the node. In the shared state, the node may read the cache block but not write the cache block without transmitting a coherency command to the home node to obtain modified state for the cache block. In the invalid state, the node may not read or write the cache block (i.e. the node does not have a valid copy of the cache block). Other embodiments may use other coherency protocols (e.g. the MESI protocol, which includes the modified, shared, and invalid states and an exclusive state in which the cache block has not yet been updated but the node is permitted to read and write the cache block, or the MOESI protocol which includes the modified, exclusive, shared, and invalid states and an owned state which indicates that there may be shared copies of the block but the copy in main memory is stale). In one embodiment, agents within the node may implement the MESI protocol for intranode coherency. Thus, the node may be viewed as having a state in the internode coherency and individual agents may have a state in the intranode coherency (consistent with the internode coherency state for the node containing the agent).

Coherency commands are transmitted and received on one of the interfaces 30A–30C by the corresponding interface circuit 20A–20C. The interface circuits 20A–20C receive coherency commands for transmission from the memory bridge 32 and transmit coherency commands received from the interfaces 30A–30C to the memory bridge 32 for processing, if the coherency commands require processing in the node 10. In some embodiments, a coherency command may be received that is passing through the node 10 to another node, and does not require processing in the node 10. The interface circuits 20A–20C may be configured to detect such commands and retransmit them (through another interface circuit 20A–20C) without involving the memory bridge 32.

In the illustrated embodiment, the interface circuits 20A–20C are coupled to the memory bridge 32 through the switch 18 (although in other embodiments, the interface circuits 20A–20C may have direct paths to the memory bridge 32). The switch 18 may selectively couple the interface circuits 20A–20C (and particularly the Rx circuits 26A–26C in the illustrated embodiment) to other interface circuits 20A–20C (and particularly the Tx circuits 28A–28C in the illustrated embodiment) or to the memory bridge 32 to transfer received coherency commands. The switch 18 may also selectively couple the memory bridge 32 to the interface circuits 20A–20C (and particularly to the Tx circuits 28A–28C in the illustrated embodiment) to transfer coherency commands generated by the memory bridge 32 from the memory bridge 32 to the interface circuits 20A–20C for transmission on the corresponding interface 30A–30C. The switch 18 may have request/grant interfaces to each of the interface circuits 20A–20C and the memory bridge 32 for requesting transfers and granting those transfers. The switch 18 may have an input path from each source (the Rx circuits 26A–26C and the memory bridge 32) and an output path to each destination (the Tx circuits 28A–28C and the memory bridge 32), and may couple a granted input path to a granted output path for transmission of a coherency command (or a portion thereof, if coherency commands are larger than one transfer through the switch 18). The couplings may then be changed to the next granted input path and granted output path. Multiple independent input path/output path grants may occur concurrently.

In one embodiment, the interfaces 30A–30C may support a set of virtual channels in which commands are transmitted. Each virtual channel is defined to flow independent of the other virtual channels, even though the virtual channels may share certain physical resources (e.g. the interface 30A–30C on which the commands are flowing). These virtual channels may be mapped to internal virtual channels (referred to as switch virtual channels herein). The switch 18 may be virtual-channel aware. That is, the switch 18 may grant a coupling between a source and a destination based not only on the ability of the source to transfer data and the destination to receive data, but also on the ability of the source to transfer data in a particular switch virtual channel and the destination to receive data on that switch virtual channel. Thus, requests from sources may indicate the destination and the virtual channel on which data is to be transferred, and requests from destinations may indicate the virtual channel on which data may be received.

Generally speaking, a node may include one or more coherent agents (dotted enclosure 16 in FIG. 1). In the embodiment of FIG. 1, the processors 12A–12N, the L2 cache 36, and the memory controller 14 may be examples of coherent agents 16. Additionally, the memory bridge 32 may be a coherent agent (on behalf of other nodes). However, other embodiments may include other coherent agents as well, such as a bridge to one or more I/O interface circuits, or the I/O interface circuits themselves. Generally, an agent includes any circuit which participates in transactions on an interconnect. A coherent agent is an agent that is capable of performing coherent transactions and operating in a coherent fashion with regard to transactions. A transaction is a communication on an interconnect. The transaction is sourced by one agent on the interconnect, and may have one or more agents as a target of the transaction. Read transactions specify a transfer of data from a target to the source, while write transactions specify a transfer of data from the source to the target. Other transactions may be used to communicate between agents without transfer of data, in some embodiments.

Each of the interface circuits 20A–20C are configured to receive and transmit on the respective interfaces 30A–30C to which they are connected. The Rx circuits 26A–26C handle the receiving of communications from the interfaces 30A–30C, and the Tx circuits 28A–28C handle the transmitting of communications on the interfaces 30A–30C.

Each of the interfaces 30A–30C used for coherent communications are defined to be capable of transmitting and receiving coherency commands. Particularly, in the embodiment of FIG. 1, those interfaces 30A–30C may be defined to receive/transmit coherency commands to and from the node 10 from other nodes. Additionally, other types of commands may be carried. In one embodiment, each interface 30A–30C may be a HyperTransport™ (HT) interface, including an extension to the HT interface to include coherency commands (HTcc). Additionally, in some embodiments, an extension to the HyperTransport interface to carry packet data (Packet over HyperTransport, or POHT) may be supported. As used herein, coherency commands include any communications between nodes that are used to maintain coherency between nodes. The commands may include read or write requests initiated by a node to fetch or update a cache block belonging to another node, probes to invalidate cached copies of cache blocks in remote nodes (and possibly to return a modified copy of the cache block to the home node), responses to probe commands, fills which transfer data, etc.

In some embodiments, one or more of the interface circuits 20A–20C may not be used for coherency management and may be defined as packet interfaces. Such interfaces 30A–30C may be HT interfaces. Alternative, such interfaces 30A–30C may be system packet interfaces (SPI) according to any level of the SPI specification set forth by the Optical Internetworking Forum (e.g. level 3, level 4, or level 5). In one particular embodiment, the interfaces may be SPI-4 phase 2 interfaces. In the illustrated embodiment, each interface circuit 20A–20C may be configurable to communicate on either the SPI-4 interface or the HT interface. Each interface circuit 20A–20C may be individually programmable, permitting various combinations of the HT and SPI-4 interfaces as interfaces 30A–30C. The programming may be performed in any fashion (e.g. sampling certain signals during reset, shifting values into configuration registers (not shown) during reset, programming the interfaces with configuration space commands after reset, pins that are tied up or down externally to indicate the desired programming, etc.). Other embodiments may employ any interface capable of carrying packet data (e.g. the Media Independent Interface (MII) or the Gigabit MII (GMII) interfaces, X.25, Frame Relay, Asynchronous Transfer Mode (ATM), etc.). The packet interfaces may carry packet data directly (e.g. transmitting the packet data with various control information indicating the start of packet, end of packet, etc.) or indirectly (e.g. transmitting the packet data as a payload of a command, such as PoHT).

In embodiments which also support packet traffic, the node 10 may also include a packet direct memory access (DMA) circuit configured to transfer packets to and from the memory 24 on behalf of the interface circuits 20A–20C. The switch 18 may be used to transmit packet data from the interface circuits 20A–20C to the packet DMA circuit and from the packet DMA circuit to the interface circuits 20A–20C. Additionally, packets may be routed from an Rx circuit 26A–26C to a Tx circuit 28A–28C through the switch 18, in some embodiments.

The processors 12A–12N may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The node 10 may include any number of processors (e.g. as few as one processor, two processors, four processors, etc.).

The L2 cache 36 may be any type and capacity of cache memory, employing any organization (e.g. set associative, direct mapped, fully associative, etc.). In one embodiment, the L2 cache 36 may be an 8 way, set associative, 1 MB cache. The L2 cache 36 is referred to as L2 herein because the processors 12A–12N may include internal (L1) caches. In other embodiments the L2 cache 36 may be an L1 cache, an L3 cache, or any other level as desired.

The memory controller 14 is configured to access the memory 24 in response to read and write transactions received on the interconnect 22. The memory controller 14 may receive a hit signal from the L2 cache, and if a hit is detected in the L2 cache for a given read/write transaction, the memory controller 14 may not respond to that transaction. The memory controller 14 may be designed to access any of a variety of types of memory. For example, the memory controller 14 may be designed for synchronous dynamic random access memory (SDRAM), and more particularly double data rate (DDR) SDRAM. Alternatively, the memory controller 16 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The interconnect 22 may be any form of communication medium between the devices coupled to the interconnect. For example, in various embodiments, the interconnect 22 may include shared buses, crossbar connections, point-to-point connections in a ring, star, or any other topology, meshes, cubes, etc. The interconnect 22 may also include storage, in some embodiments. In one particular embodiment, the interconnect 22 may comprise a bus. The bus may be a split transaction bus, in one embodiment (i.e. having separate address and data phases). The data phases of various transactions on the bus may proceed out of order with the address phases. The bus may also support coherency and thus may include a response phase to transmit coherency response information. The bus may employ a distributed arbitration scheme, in one embodiment. In one embodiment, the bus may be pipelined. The bus may employ any suitable signaling technique. For example, in one embodiment, differential signaling may be used for high speed signal transmission. Other embodiments may employ any other signaling technique (e.g. TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired.

Various embodiments of the node 10 may include additional circuitry, not shown in FIG. 1. For example, the node 10 may include various I/O devices and/or interfaces. Exemplary I/O may include one or more PCI interfaces, one or more serial interfaces, Personal Computer Memory Card International Association (PCMCIA) interfaces, etc. Such interfaces may be directly coupled to the interconnect 22 or may be coupled through one or more I/O bridge circuits.

In one embodiment, the node 10 (and more particularly the processors 12A–12N, the memory controller 14, the L2 cache 36, the interface circuits 20A–20C, the memory bridge 32 including the remote line directory 34, the switch 18, the configuration register 38, and the interconnect 22) may be integrated onto a single integrated circuit as a system on a chip configuration. The additional circuitry mentioned above may also be integrated. Alternatively, other embodiments may implement one or more of the devices as separate integrated circuits. In another configuration, the memory 24 may be integrated as well. Alternatively, one or more of the components may be implemented as separate integrated circuits, or all components may be separate integrated circuits, as desired. Any level of integration may be used.

It is noted that, while three interface circuits 20A–20C are illustrated in FIG. 1, one or more interface circuits may be implemented in various embodiments. As used herein, an interface circuit includes any circuitry configured to communicate on an interface according to the protocol defined for the interface. The interface circuit may include receive circuitry configured to receive communications on the interface and transmit the received communications to other circuitry internal to the system that includes the interface circuit. The interface circuit may also include transmit circuitry configured to receive communications from the other circuitry internal to the system and configured to transmit the communications on the interface.

It is noted that the discussion herein may describe cache blocks and maintaining coherency on a cache block granularity (that is, each cache block has a coherency state that applies to the entire cache block as a unit). Other embodiments may maintain coherency on a different granularity than a cache block, which may be referred to as a coherency block. A coherency block may be smaller than a cache line, a cache line, or larger than a cache line, as desired. The discussion herein of cache blocks and maintaining coherency therefor applies equally to coherency blocks of any size.

Additional CC-NUMA Details, One Embodiment

FIGS. 2–6 illustrate additional details regarding one exemplary embodiment of a CC-NUMA protocol that may be employed by one embodiment of the node 10. The embodiment of FIGS. 2–6 is merely exemplary. Numerous other implementations of CC-NUMA protocols or other distributed memory system protocols may be used in other embodiments.

Turning next to FIG. 2, a table 42 is shown illustrating an exemplary set of transactions supported by one embodiment of the interconnect 22 and a table 44 is shown illustrating an exemplary set of coherency commands supported by one embodiment of the interfaces 30. Other embodiments including subsets, supersets, or alternative sets of commands may be used.

The transactions illustrated in the table 42 will next be described. An agent in the node 10 may read a cache block (either remote or local) using the read shared (RdShd) or read exclusive (RdExc) transactions on the interconnect 22. The RdShd transaction is used to request a shared copy of the cache block, and the RdExc transaction is used to request an exclusive copy of the cache block. If the RdShd transaction is used, and no other agent reports having a copy of the cache block during the response phase of the transaction (except for the L2 cache 36 and/or the memory controller 14), the agent may take the cache block in the exclusive state. In response to the RdExc transaction, other agents in the node invalidate their copies of the cache block (if any). Additionally, an exclusive (or modified) owner of the cache block may supply the data for the transaction in the data phase. Other embodiments may employ other mechanisms (e.g. a retry on the interconnect 22) to ensure the transfer of a modified cache block.

The write transaction (Wr) and the write invalidate transaction (WrInv) may be used by an agent to write a cache block to memory. The Wr transaction may be used by an owner having the modified state for the block, since no other copies of the block need to be invalidated. The WrInv transaction may be used by an agent that does not have exclusive ownership of the block (the agent may even have the invalid state for the block). The WrInv transaction causes other agents to invalidate any copies of the block, including modified copies. The WrInv transaction may be used by an agent that is writing the entire cache block. For example, a DMA that is writing the entire cache block with new data may use the transaction to avoid a read transaction followed by a write transaction.

The RdKill and RdInv transactions may be used by the memory bridge 32 in response to probes received by the node 10 from other nodes. The RdKill and RdInv transactions cause the initiator (the memory bridge 32) to acquire exclusive access to the cache block and cause any cache agents to invalidate their copies (transferring data to the initiator similar to the RdShd and RdExc transactions). In one embodiment, the RdKill transaction also cancels a reservation established by the load-linked instruction in the MIPS instruction set, while the RdInv transaction does not. In other embodiments, a single transaction may be used for probes. In still other embodiments, there may be a probe-generated transaction that invalidates agent copies of the cache block (similar to the RdKill and RdInv transactions) and another probe-generated transaction that permits agents to retain shared copies of the cache block.

The WrFlush transaction is a write transaction which may be initiated by an agent and another agent may have an exclusive or modified copy of the block. The other agent provides the data for the WrFlush transaction, or the initiating agent provides the data if no other agent has an exclusive or modified copy of the block. The WrFlush transaction may be used, in one embodiment as described above by the L2 cache 36.

The Nop transaction is a no-operation transaction. The Nop may be used if an agent is granted use of the interconnect 22 (e.g. the address bus, in embodiments in which the interconnect 22 is a split transaction bus) and the agent determines that it no longer has a transaction to run on the interconnect 22.

The commands illustrated in the table 44 will next be described. In the table 44, the command is shown as well as the virtual channel in which the command travels on the interfaces 30. The virtual channels may include, in the illustrated embodiment: the coherent read (CRd) virtual channel; the probe (Probe) virtual channel; the acknowledge (Ack) virtual channel; and coherent fill (CFill) virtual channel. The CRd, Probe, Ack, and CFill virtual channels are defined for the HTcc commands. There may be additional virtual channels for the standard HT commands (e.g. non-posted command (NPC) virtual channel, the posted command (PC) virtual channel, and the response (RSP) virtual channel).

The cRdShd or cRdExc commands may be issued by the memory bridge 32 in response to a RdShd or RdExc transactions on the interconnect 22, respectively, to read a remote cache block not stored in the node (or, in the case of RdExc, the block may be stored in the node but in the shared state). If the cache block is stored in the node (with exclusive ownership, in the case of the RdExc transaction), the read is completed on the interconnect 22 without any coherency command transmission by the memory bridge 32.

The Flush and Kill commands are probe commands for this embodiment. The memory bridge 32 at the home node of a cache block may issue probe commands in response to a cRdShd or cRdExc command. The memory bridge 32 at the home node of the cache block may also issue a probe command in response to a transaction for a local cache block, if one or more remote nodes has a copy of the cache block. The Flush command is used to request that a remote modified owner of a cache block return the cache block to the home node (and invalidate the cache block in the remote modified owner). The Kill command is used to request that a remote owner invalidate the cache block. In other embodiments, additional probe commands may be supported for other state change requests (e.g. allowing remote owners to retain a shared copy of the cache block).

The probe commands are responded to (after effecting the state changes requested by the probe commands) using either the Kill_Ack or WB commands. The Kill_Ack command is an acknowledgement that a Kill command has been processed by a receiving node. The WB command is a write back of the cache block, and is transmitted in response to the Flush command. The WB command may also be used by a node to write back a remote cache block that is being evicted from the node.

The Fill command is the command to transfer data to a remote node that has transmitted a read command (cRdExc or cRdShd) to the home node. The Fill command is issued by the memory bridge 32 in the home node after the probes (if any) for a cache block have completed.

Figure 3:
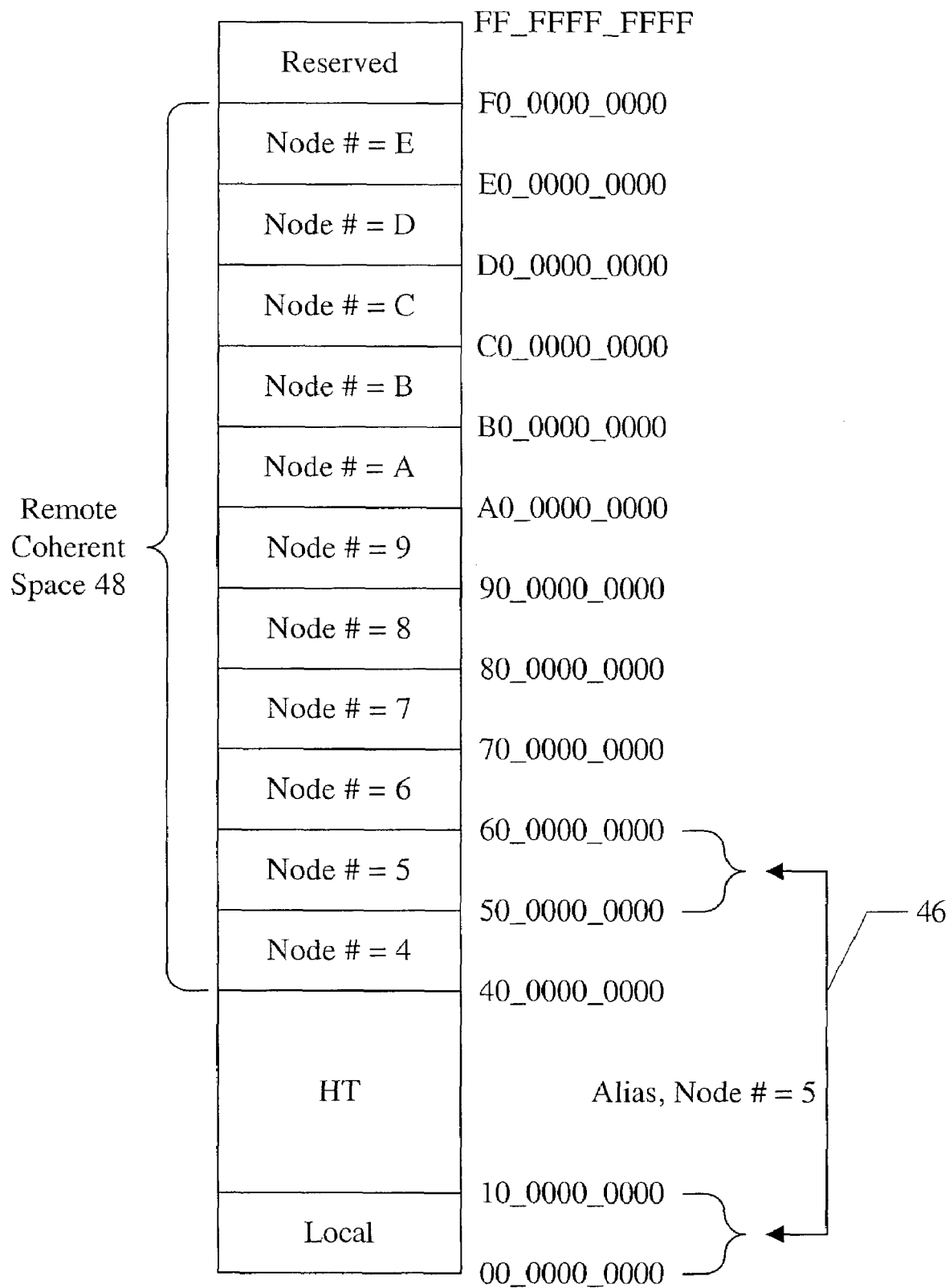
FIG. 3 is a block diagram of an address space supported by one embodiment of the node shown in FIG. 1.

Turning next to FIG. 3, a block diagram illustrating one embodiment of an address space implemented by one embodiment of the node 10 is shown. Addresses shown in FIG. 3 are illustrated as hexadecimal digits, with an under bar ("_") separating groups of four digits. Thus, in the embodiment illustrated in FIG. 3, 40 bits of address are supported. In other embodiments, more or fewer address bits may be supported.

In the embodiment of FIG. 3, the address space between 00_0000_0000 and 0F_FFFF_FFFF is treated as local address space. Transactions generated by agents in the local address space do not generate coherency commands to other nodes, although coherency may be enforced within the node 10 for these addresses. That is, the local address space is not maintained coherent with other nodes. Various portions of the local address space may be memory mapped to I/O devices, HT, etc. as desired.

The address space between 40_0000_0000 and EF_FFFF_FFFF is the remote coherent space 48. That is, the address space between 40_0000_0000 and EF_FFFF_FFFF is maintained coherent between the nodes. Each node is assigned a portion of the remote coherent space, and that node is the home node for the portion. As shown in FIG. 1, each node is programmable with a node number. The node number is equal to the most significant nibble (4 bits) of the addresses for which that node is the home node, in this embodiment. Thus, the node numbers may range from 4 to E in the embodiment shown. Other embodiments may support more or fewer node numbers, as desired. In the illustrated embodiment, each node is assigned a 64 Gigabyte (GB) portion of the memory space for which it is the home node. The size of the portion assigned to each node may be varied in other embodiments (e.g. based on the address size or other factors).

For a given coherent node, there is an aliasing between the remote coherent space for which that node is the home node and the local address space of that node. That is, corresponding addresses in the local address space and the portion of the remote coherent space for which the node is the home node access the same memory locations in the memory 24 of the node (or are memory mapped to the same I/O devices or interfaces, etc.). For example, the node having node number 5 aliases the address space 50_0000_0000 through 5F_FFFF_FFFF to 00_0000_0000 through 0F_FFFF_FFFF respectively (arrow 46). Internode coherent accesses to the memory 24 at the node 10 use the node-numbered address space (e.g. 50_0000_0000 to 5F_FFFF_FFFF, if the node number programmed into node 10 is 5) to access cache blocks in the memory 24. That is agents in other nodes and agents within the node that are coherently accessing cache blocks in the memory use the remote coherent space, while access in the local address space are not maintained coherent with other nodes (even though the same cache block may be accessed). Thus the addresses are aliased, but not maintained coherent, in this embodiment. In other embodiments, the addresses in the remote coherent space and the corresponding addresses in the local address space may be maintained coherent.

A cache block is referred to as local in a node if the cache block is part of the memory assigned to the node (as mentioned above). Thus, the cache block may be local if it is accessed from the local address space or the remote coherent space, as long as the address is in the range for which the node is the home node. Similarly, a transaction on the interconnect 22 that accesses a local cache block may be referred to as a local transaction or local access. A transaction on the interconnect 22 that accesses a remote cache block (via the remote coherent address space outside of the portion for which the node is the home node) may be referred to as a remote transaction or a remote access.

The address space between 10_0000_0000 and 3F_FFFF_FFFF may be used for additional HT transactions (e.g. standard HT transactions) in the illustrated embodiment. Additionally, the address space between F0_0000_0000 and FF_FFFF_FFFF may be reserved in the illustrated embodiment.

It is noted that, while the most significant nibble of the address defines which node is being accessed, other embodiments may use any other portion of the address to identify the node. Furthermore, other information in the transaction may be used to identify remote versus local transactions, in other embodiments (e.g. command type, control information transmitted in the transaction, etc.).

Figure 4:
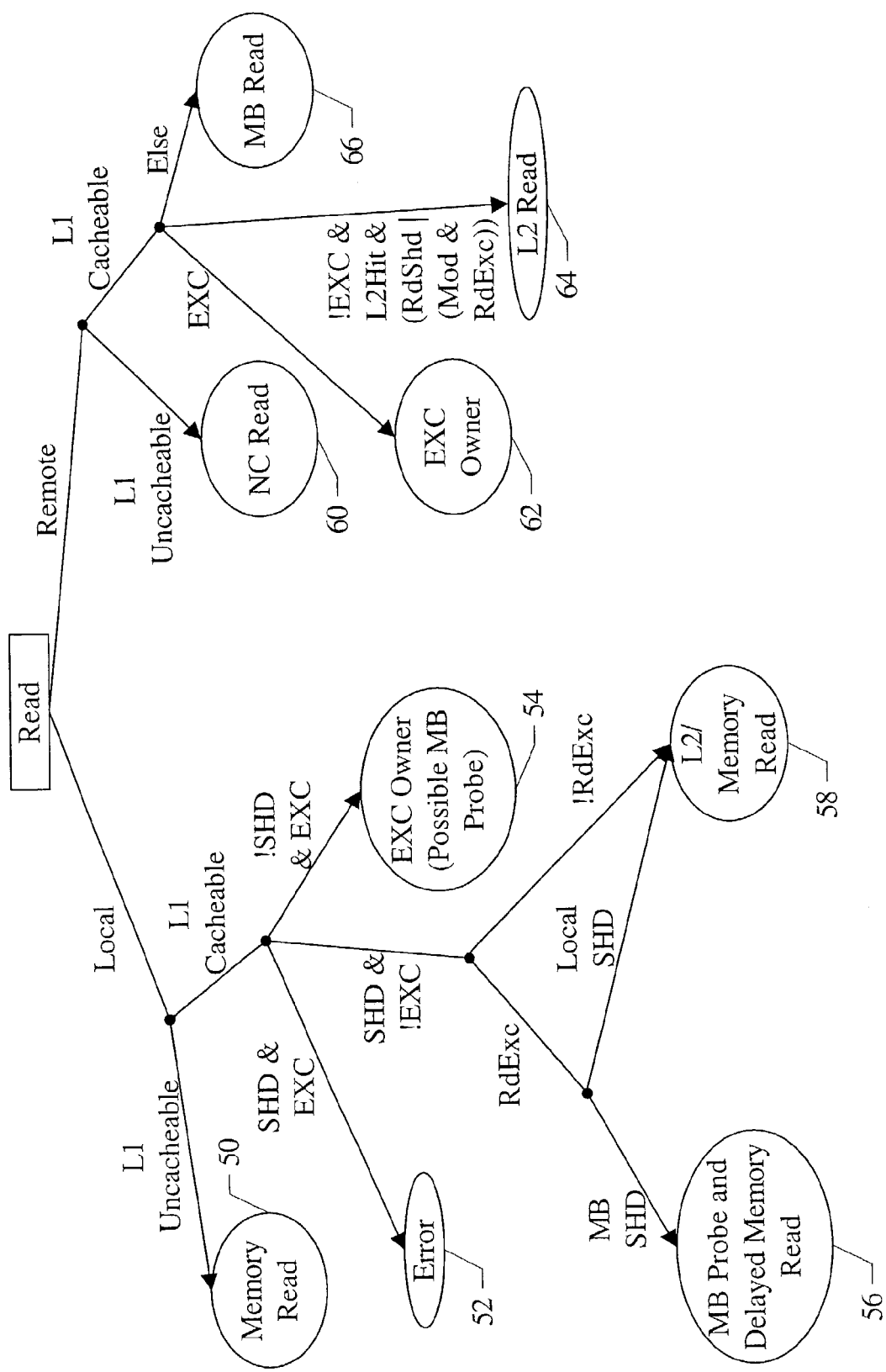
FIG. 4 is a decision tree illustrating operation of one embodiment of a node for a read transaction on the interconnect within the node.

Turning next to FIG. 4, a decision tree for a read transaction to a memory space address on the interconnect 22 of a node 10 is shown for one embodiment. The decision tree may illustrate operation of the node 10 for the read transaction for different conditions of the transaction, the state of the cache block accessed by the transaction, etc. The read transaction may, in one embodiment, include the RdShd, RdExc, RdKill, and RdInv transactions shown in the table 42 of FIG. 2. Each dot on the lines within the decision tree represents a divergence point of one or more limbs of the tree, which are labeled with the corresponding conditions. Where multiple limbs emerge from a dot, taking one limb also implies that the conditions for the other limbs are not met. In FIG. 4, the exclamation point ("!") is used to indicate a logical NOT. Not shown in FIG. 4 is the state transition made by each coherent agent which is caching a copy of the cache block for the read transaction. If the read transaction is RdShd, the coherent agent may retain a copy of the cache block in the shared state. Otherwise, the coherent agent invalidates its copy of the cache block.

The transaction may be either local or remote, as mentioned above. For local transactions, if the transaction is uncacheable, then a read from the memory 24 is performed (reference numeral 50). In one embodiment, the transaction may include an indication of whether or not the transaction is cacheable. If the transaction is uncacheable, it is treated as a non-coherent transaction in the present embodiment.

If the local transaction is cacheable, the operation of the node 10 is dependent on the response provided during the response phase of the transaction. In one embodiment, each coherent agent responds with the state of the cache block in that agent. For example, each coherent agent may have an associated shared (SHID) and exclusive (EXC) signal. The agent may signal invalid state by deasserting both the SHD and EXC signals. The agent may signal shared state by asserting the SHD signal and deasserting the EXC signal. The agent may signal exclusive state (or modified state) by asserting the EXC signal and deasserting the SHD signal. The exclusive and modified states may be treated the same in the response phase in this embodiment, and the exclusive/modified owner may provide the data. The exclusive/modified owner may provide, concurrent with the data, an indication of whether the state is exclusive or modified. While each agent may have its own SHD and EXC signals in this embodiment (and the initiating agent may receive the signals from each other agent), in other embodiments a shared SHD and EXC signal may be used by all agents.

If both the SHD and EXC responses are received for the local transaction, an error has occurred (reference numeral 52). The memory controller may return a fatal error indication for the read transaction, in one embodiment. If the response is exclusive (SHD deasserted, EXC asserted) the exclusive owner provides the data for the read transaction on the interconnect 22 (reference numeral 54). If the exclusive owner is the memory bridge 32 (as recorded in the remote line directory 34), then a remote node has the cache block in the modified state. The memory bridge 32 issues a probe (Flush command) to retrieve the cache block from that remote node. The memory bridge 32 may supply the cache block returned from the remote node as the data for the read on the interconnect 22.

If the response is shared (SHD asserted, EXC deasserted), the local transaction is RdExc, and the memory bridge 32 is one of the agents reporting shared, then at least one remote node may have a shared copy of the cache block. The memory bridge 32 may initiate a probe (Kill command) to invalidate the shared copies of the cache block in the remote node(s) (reference numeral 56). In one embodiment, the data may be read from memory (or the L2 cache 36) for this case, but the transfer of the data may be delayed until the remote node(s) have acknowledged the probe. The memory bridge 32 may signal the memory controller 14/L2 cache 36 when the acknowledgements have been received. In one embodiment, each transaction may have a transaction identifier on the interconnect 22. The memory bridge 32 may transmit the transaction identifier of the RdExc transaction to the memory controller 14/L2 cache 36 to indicate that the data may be transmitted.

If the response is shared, the local transaction is RdExc, and the sharing agents are local agents (i.e. the memory bridge 32 does not report shared), then the L2 cache 36 or the memory controller 14 may supply the data, depending on whether or not there is an L2 hit for the cache block (reference numeral 58). Similarly, if the response is shared and the transaction is not RdExc, the L2 cache 36 or the memory controller 14 may supply the data dependent on whether or not there is an L2 hit for the cache block.

If the transaction is remote and uncacheable, then the memory bridge 32 may generate a noncoherent read command on the interfaces 30 to read the data. For example, a standard HT read command may be used (reference numeral 60). If the remote transaction is cacheable and the response on the interconnect 22 is exclusive, then the exclusive owner supplies the data for the read (reference numeral 62). If the remote transaction is cacheable, the response is not exclusive, the cache block is an L2 cache hit, and the transaction is either RdShd or the transaction is RdExc and the L2 cache has the block in the modified state, then the L2 cache 36 supplies the data for the read (reference numeral 64). Otherwise, the memory bridge 32 initiates a corresponding read command to the home node of the cache block (reference numeral 66).

Figure 5:
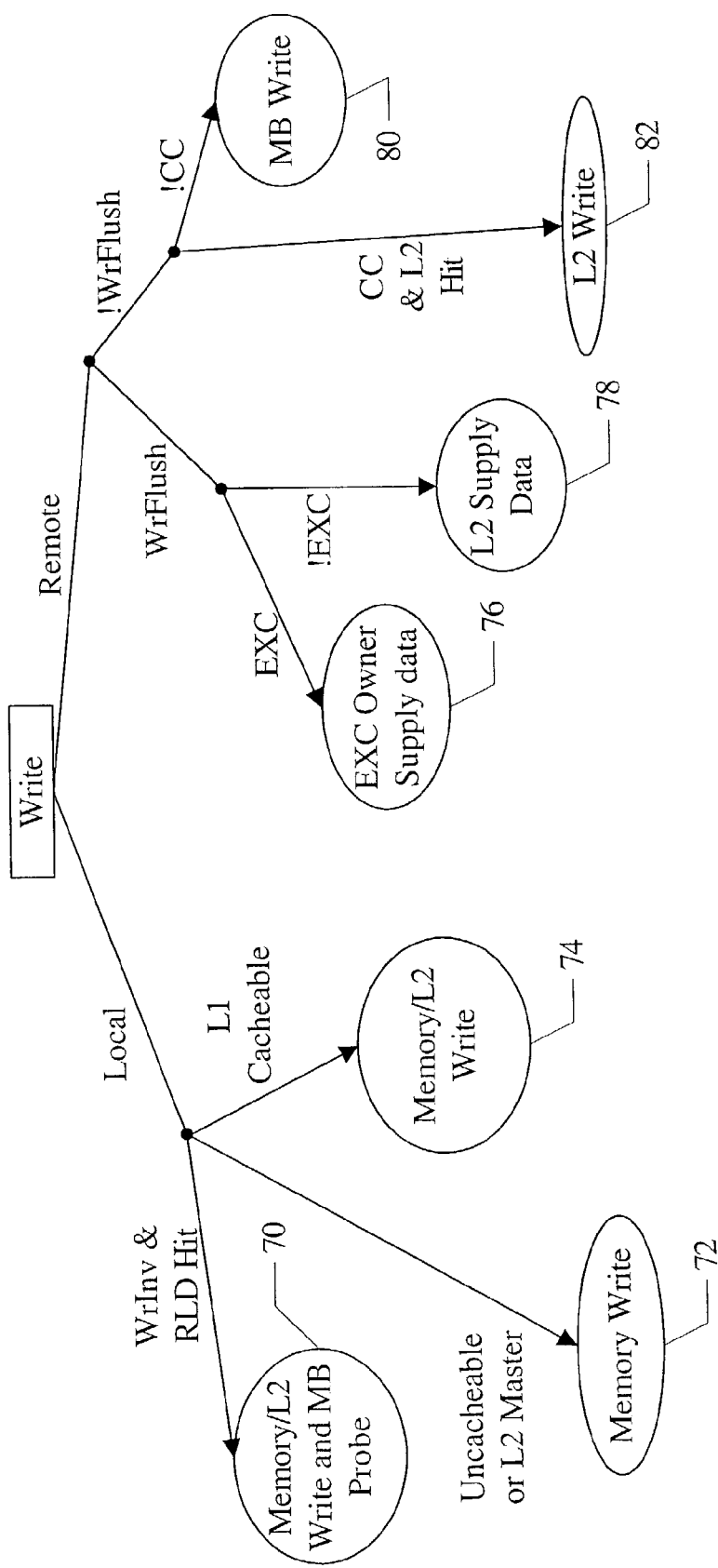
FIG. 5 is a decision tree illustrating operation of one embodiment of a node for a write transaction on the interconnect within the node.

Turning next to FIG. 5, a decision tree for a write transaction to a memory space address on the interconnect 22 of a node 10 is shown for one embodiment. The decision tree may illustrate operation of the node for the write transaction for different conditions of the transaction, the state of the cache block accessed by the transaction, etc. The write transaction may, in one embodiment, include the Wr, WrInv, and WrFlush transactions shown in the table 42 of FIG. 2. Each dot on the lines within the decision tree represents a divergence point of one or more limbs of the tree, which are labeled with the corresponding conditions. Where multiple limbs emerge from a dot, taking one limb also implies that the conditions for the other limbs are not met. In FIG. 5, the exclamation point ("!") is used to indicate a logical NOT. Not shown in FIG. 5 is the state transition made by each coherent agent which is caching a copy of the cache block for the write transaction. The coherent agent invalidates its copy of the cache block.

If the transaction is a local transaction, and the transaction is a WrInv transaction that hits in the remote line directory 34 (i.e. a remote node is caching a copy of the cache block), the memory controller 14 (and the L2 cache 36, if an L2 hit) updates with the write data (reference numeral 70). Additionally, the memory bridge 32 may generate probes to the remote nodes indicated by the remote line directory 34. The update of the memory/L2 cache may be delayed until the probes have been completed, at which time the memory bridge 32 may transmit the transaction identifier of the WrInv transaction to the L2 cache 36/memory controller 14 to permit the update.

If the local transaction is uncacheable or if the L2 cache 36 is the master of the transaction (that is, the L2 cache 36 initiated the transaction), then the memory controller 14 updates with the data (reference numeral 72). If the local transaction is cacheable, the memory controller 14 and/or the L2 cache 36 updates with the data based on whether or not there is an L2 cache hit (and, in some embodiments, based on an L2 cache allocation indication in the transaction, which allows the source of the transaction to indicate whether or not the L2 cache allocates a cache line for an L2 cache miss) (reference numeral 74).

If the transaction is a remote transaction, the transaction is a WrFlush transaction, and the response to the transaction is exclusive, the exclusive owner supplies the data (reference numeral 76). If the remote WrFlush transaction results in a non-exclusive response (shared or invalid), the L2 cache 36 supplies the data of the WrFlush transaction. In one embodiment, the L2 cache 36 retains the state of the node as recorded in the home node, and the L2 cache 36 uses the WrFlush transaction to evict a remote cache block which is in the modified state in the node. Thus, if another agent has the cache block in the exclusive state, that agent may have a more recent copy of the cache block that should be returned to the home node. Otherwise, the L2 cache 36 supplies the block to be returned to the home node (reference numeral 78). In either case, the memory bridge 32 may capture the WrFlush transaction and data, and may perform a WB command to return the cache block to the home node.

If the remote transaction is not a WrFlush transaction, and is not cache coherent, the memory bridge 32 receives the write transaction and performs a noncoherent Wr command (e.g. a standard HT write) to transmit the cache block to the home node (reference numeral 80). If the remote transaction is not a WrFlush transaction, is cache coherent, and is an L2 hit, the L2 cache 36 may update with the data (reference numeral 82).

Figure 6:
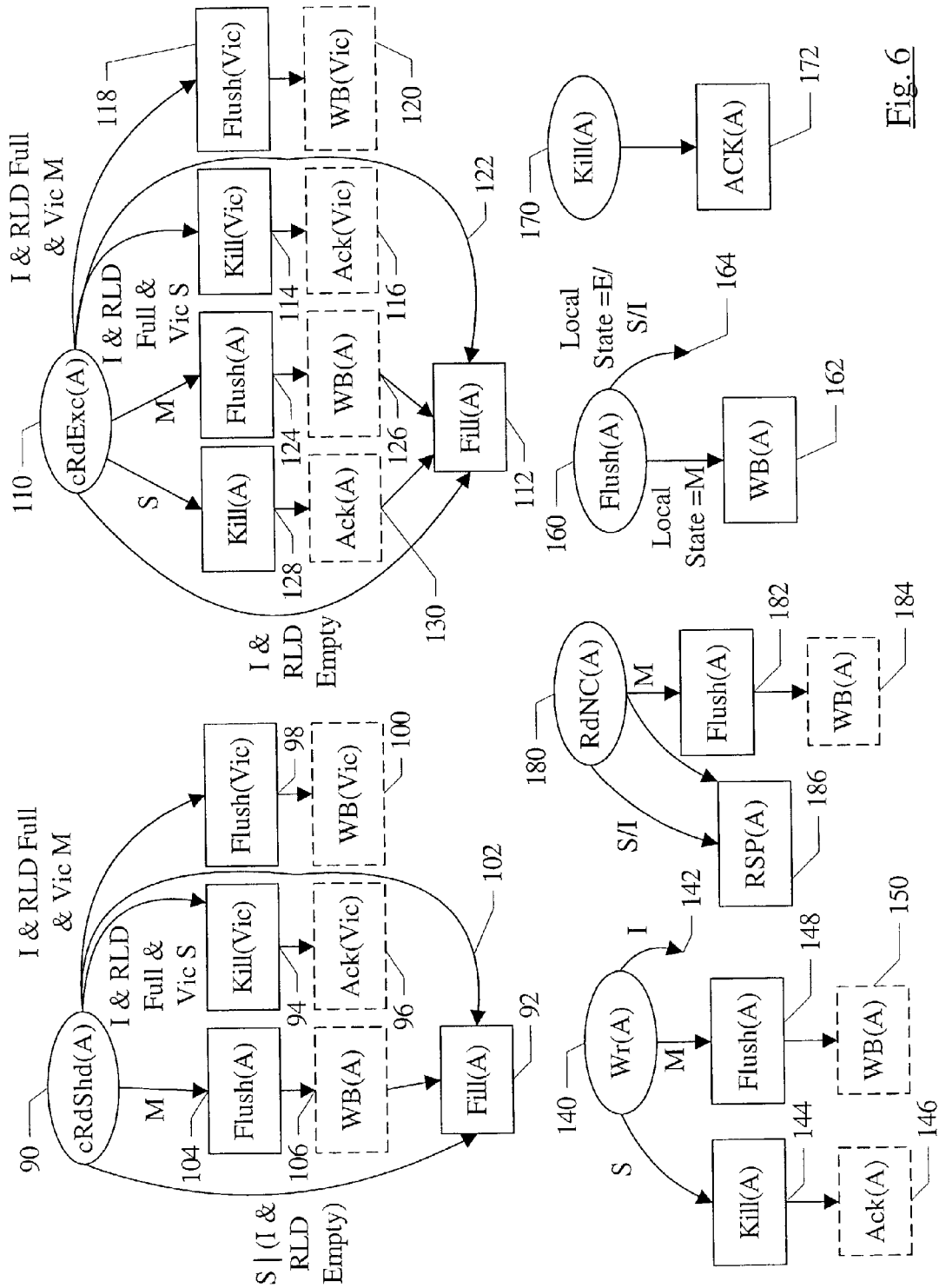
FIG. 6 is a diagram illustrating operation of one embodiment of the memory bridge for remote coherency commands received by the memory bridge.

Turning next to FIG. 6, a block diagram illustrating operation of one embodiment of the memory bridge 32 in response to various coherency commands received from the interface circuits 20A–20C is shown. The received command is shown in an oval. Commands initiated by the memory bridge 32 in response to the received command (and the state of the affected cache block as indicated in the remote line directory 34) are shown in solid boxes. Dotted boxes are commands received by the memory bridge 32 in response to the commands transmitted in the preceding solid boxes. The cache block affected by a command is shown in parentheses after the command.

In one embodiment, the remote line directory 34 may be accessed in response to a transaction on the interconnect 22. In such an embodiment, the memory bridge 32 may initiate a transaction on the interconnect 22 in response to certain coherent commands in order to retrieve the remote line directory 34 (as well as to affect any state changes in the coherent agents coupled to the interconnect 22, if applicable). In other embodiments, the memory bridge 32 may be configured to read the remote line directory 34 prior to generating a transaction on the interconnect 22, and may conditionally generate a transaction if needed based on the state of the remote line directory 34 for the requested cache block. Additionally, in one embodiment, the remote line directory 34 may maintain the remote state for a subset of the local cache blocks that are shareable remotely (e.g. a subset of the portion of the remote coherent space 48 that is assigned to the local node). If a cache block is requested by a remote node using a coherency command and there is no entry in the remote line directory 34 for the cache block, then a victim cache block may be replaced in the remote line directory 34 (and probes may be generated to invalidate the victim cache block in remote nodes). In other embodiments, the remote line directory 34 may be configured to track the state of each cache block in the portion of the remote coherent space 48 that is assigned to the local node. In such embodiments, operations related to the victim cache blocks may be omitted from FIG. 6.

For a cRdShd command for cache block "A" received by the memory bridge 32 (reference numeral 90), the memory bridge 32 may generate a RdShd transaction on the interconnect 22. Based on the remote line directory (RLD) state for the cache block A, a number of operations may occur. If the RLD state is shared, or invalid and there is an entry available for allocation without requiring a victim cache block to be evicted ("RLD empty" in FIG. 6), then the memory bridge 32 may transmit a fill command to the remote node with the data supplied to the memory bridge 32 in response to the RdShd transaction on the interconnect 22 (reference numeral 92). On the other hand, if the RLD state is invalid and an eviction of a victim block is used to free an RLD entry for cache block A, then the memory bridge 32 may transmit probes to the remote nodes having copies of the victim cache block. If the victim cache block is shared, the memory bridge 32 may transmit a Kill command (or commands, if multiple nodes are sharing the victim cache block) for the victim block (reference numeral 94). The remote nodes respond with Kill_Ack commands for the victim block (reference numeral 96). If the victim block is modified, the memory bridge 32 may transmit a Flush command to the remote node having the modified state (reference numeral 98). The remote node may return the modified block with a WB command (reference numeral 100). In either case of evicting a victim block, the memory bridge 32 may, in parallel, generate a Fill command for the cache block A (reference numeral 92, via arrow 102). Finally, if the RLD state is modified for the cache block A, the memory bridge 32 may generate a Flush command for the cache block A to the remote node (reference numeral 104), which responds with a WB command and the cache block A (reference numeral 106). The memory bridge 32 may then transmit the Fill command with the cache block A provided via the write back command (reference numeral 92).

In response to a cRdExc command for a cache block A (reference numeral 110), operation may be similar to the cRdShd case for some RLD states. Similar to the cRdShd case, the memory bridge 32 may initiate a RdExc transaction on the interconnect 22 in response to the cRdExc command. Similar to the cRdShd case, if the RLD is invalid and no eviction of a victim cache block is needed in the RLD to allocate an entry for the cache block A, then the memory bridge 32 may supply the cache block supplied on the interconnect 22 for the RdExc transaction in a fill command to the remote node (reference numeral 112). Additionally, if the RLD state is invalid for the cache block A and a victim cache block is evicted from the RLD 34, the memory bridge 32 may operate in a similar fashion to the cRdShd case (reference numerals 114 and 116 and arrow 122 for the shared case of the victim block and reference numerals 118 and 120 and arrow 122 for the modified case of the victim block). If the RLD state is modified for the cache block A, the memory bridge 32 may operate in a similar fashion to the cRdShd case (reference numerals 124 and 126). If the RLD state is shared for the cache block A, the memory bridge 32 may generate Kill commands for each remote sharing node (reference numeral 128). The memory bridge 32 may wait for the Kill_Ack commands from the remote sharing nodes (reference numeral 130), and then transmit the Fill command with the cache block A provided on the interconnect 22 in response to the RdExc transaction (reference numeral 112).

In response to a Wr command to the cache block A, the memory bridge 32 may generate a Wr transaction on the interconnect 22 (reference numeral 140). If the RLD state is invalid for the cache block A, the memory bridge 32 may transmit the write data on the interconnect 22 and the Wr command is complete (reference numeral 142). If the RLD state is shared for the cache block A, the memory bridge 32 may generate Kill commands to each remote sharing node (reference numeral 144) and collect the Kill_Ack commands from those remote nodes (reference numeral 146) in addition to transmitting the data on the interconnect 22. If the RLD state is modified for a remote node, the memory bridge 32 may generate a Flush command to the remote node (reference numeral 148) and receive the WB command from the remote node (reference numeral 150). In one embodiment, the memory bridge 32 may delay transmitting the write data on the interconnect 22 until the WB command or Kill_Ack commands are received (although the data returned with the WB command may be dropped by the memory bridge 32).

The above commands are received by the memory bridge 32 for cache blocks for which the node 10 including the memory bridge 32 is the home node. The memory bridge 32 may also receive Flush commands or Kill commands for cache blocks for which the node 10 is a remote node. In response to a Flush command to the cache block A (reference numeral 160), the memory bridge 32 may initiate a RdInv transaction on the interconnect 22. If the local state of the cache block is modified, the memory bridge 32 may transmit a WB command to the home node, with the cache block supplied on the interconnect 22 in response to the RdInv transaction (reference numeral 162). If the local state of the cache block is not modified, the memory bridge 32 may not respond to the Flush command (reference numeral 164). In this case, the node may already have transmitted a WB command to the home node (e.g. in response to evicting the cache block locally). In response to a Kill command to the cache block A (reference numeral 170), the memory bridge 32 may initiate a RdKill transaction on the interconnect 22. The memory bridge 32 may respond to the Kill command with a Kill_Ack command (reference numeral 172).

In one embodiment, the memory bridge 32 may also be configured to receive a non-cacheable read (RdNC) command (e.g. corresponding to a standard HT read) (reference numeral 180). In response, the memory bridge 32 may initiate a RdShd transaction on the interconnect 22. If the RLD state is modified for the cache block including the data to be read, the memory bridge 32 may transmit a Flush command to the remote node having the modified cache block (reference numeral 182), and may receive the WB command from the remote node (reference numeral 184). Additionally, the memory bridge 32 may supply data received on the interconnect 22 in response to the RdShd transaction as a read response (RSP) to the requesting node (reference numeral 186).

Ambiguity and Virtual Channel Handling

As mentioned above, virtual channels may be employed to avoid deadlocks in the system due to dependencies that may exist between operations. In the above-described embodiment, dependencies may occur due to the relationship of operations being used to implement internode coherency. In other embodiments, dependencies may not be related to coherent operation (e.g. dependencies may occur for non-coherent operations such as I/O operations). Generally, a dependency of a first operation on a second operation may cause the first operation to complete after the second operation. There may be various types of dependencies. For example, a logical dependency may occur if the second operation is required to complete before the first operation completes. A logical dependency may exist between a read request and the data that is supplied in response to the read request, for example. Another type of dependency may be a data dependency. This type of dependency may occur if the first operation uses the result of the second operation, but the operations are otherwise unrelated. A read operation may be have a data dependency on a preceding operation to the same address, for example, since the data result of the preceding operation may be the data read by the read operation. Yet another type of dependency may be an ordering dependency. An ordering dependency may exist if the first operation is defined, by the protocol or protocols implemented by the node, to occur after the second operation. As used herein, an operation may include any communication that is transmitted via a virtual channel. In the present embodiment, for example, transactions on the interconnect 22 and coherency commands on the interfaces 30A–30C may be examples of operations.

There may be false dependencies between virtual channels and/or between operations in a virtual channel. In some cases, the false dependencies would cause deadlock if they were real. But since they are false, the dependencies would not necessarily cause deadlock if handled properly.

In the present embodiment, it is possible for the dependencies between operations (and thus between virtual channels) to be ambiguous. The ambiguity may cause a false dependency of a first operation in a first virtual channel on a second operation in a second virtual channel. The second operation may have dependencies on other operations, including, e.g., a third operation in the first virtual channel. Thus, the first operation may have a dependency on the third operation (due to its dependency on the second operation). In other cases, some operations in the first virtual channel may have direct dependencies on other operations in the first virtual channel. The first virtual channel, in this case, is really a merging of two virtual channels into one ambiguous virtual channel. The merging of the two virtual channels may be performed because a given operation could be placed in either of the virtual channels (depending on whether or not there is a dependency), but which channel is correct is unclear until after the given operation is allocated resources in one of the channels. Generally, one of the two virtual channels that are merged into the first virtual channel includes the operations which may have a dependency on an operation in the other of the two virtual channels. If the number of operations which may have the dependency can be bounded by a maximum, then deadlock may be avoided by providing a number of buffers for the first virtual channel that exceeds the maximum.

Figure 7:
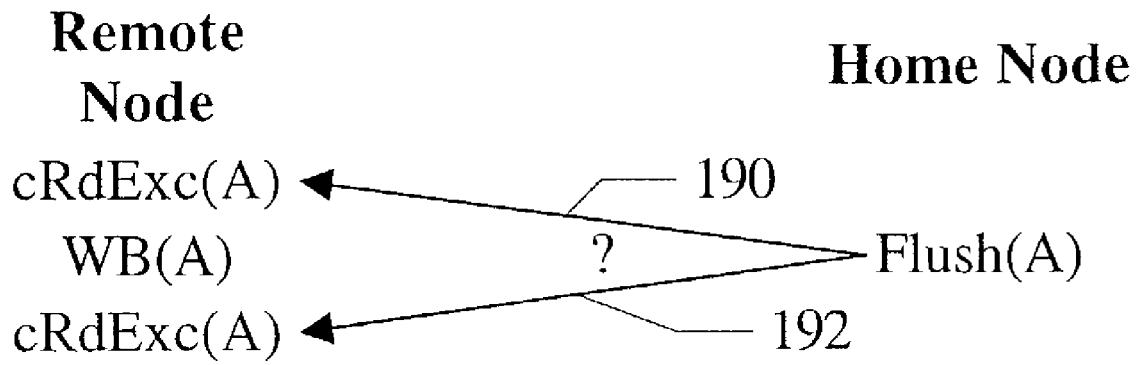
FIG. 7 is a block diagram illustrating examples of ambiguity between certain coherency commands in one embodiment of the node illustrated in FIG. 1.
Figure 7:
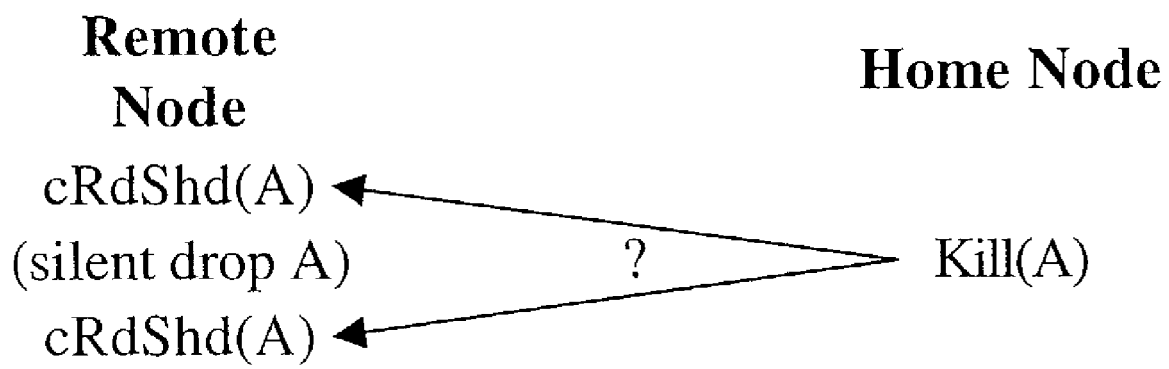

Two examples of false dependencies are illustrated in FIG. 7, although variations on these two examples may occur as well. At the top of FIG. 7, a first example of a set of coherency commands initiated in a remote node to a cache block "A" are shown. That is, the cache block A is a remote cache block for the remote node. First, a cRdExc(A) is initiated by the remote node, then a WB(A) writing back the cache block is initiated (e.g. due to the cache block being evicted from the remote node). Then a cRdExc(A) is initiated again (e.g. due to a cache miss after the eviction). At some point while the second cRdExc(A) is outstanding, the home node may initiate a Flush(A) to request that the remote node write back the cache block A and invalidate the cache block A in the remote node.

The ambiguity is in determining which of the cRdExc(A) commands is targeted by the Flush(A) command, illustrated by the arrows 190 and 192. That is, it is ambiguous in the remote node as to whether the Flush(A) command is ordered in the home node after the second cRdExc(A) or before the second cRdExc(A). If the Flush(A) command is ordered before the second cRdExc(A) in the home node, then the Flush(A) command is targeted at the first cRdExc(A) (arrow 190). For this case, the WB(A) that would be the response to the Flush(A) command has already been initiated. That is, the remote node need not respond to the Flush(A) command, as if the Flush(A) command had arrived at the remote node prior the second cRdExc(A) command and after the WB(A) command. When the home node receives the WB(A) command, the Flush(A) command may be completed. On the other hand, if the Flush(A) command is ordered after the second cRdExc(A) in the home node, then the second cRdExc(A) is targeted by the Flush(A) command (arrow 192). The data resulting from the second cRdExc(A) command is to be returned to the home node as a WB(A) command (not shown in FIG. 7). Since the second case requires the remote node to generate a response to the Flush(A) command, the Flush(A) command may be assumed to be targeted at the second cRdExc(A) command. If the assumption is incorrect (the Flush(A) is targeted at the first cRdExc(A) command), the already-initiated WB(A) command satisfies the Flush(A) command and coherency is maintained, albeit with an unnecessarily-caused WB(A) for the second cRdExc(A) command. If the assumption is correct, then a second WB(A) command is correctly caused.

Using the above assumption, the memory bridge 32 in the receiving node may generate a probe transaction on the interconnect 22 in response to the Flush(A) command. As used herein, a "probe" refers to an operation initiated to cause an agent that receives the probe to change its coherency state for a cache block and to possibly transmit the cache block out of the agent (if the agent has a modified copy of the cache block). A probe transaction may be a transaction used for probing (e.g. the RdKill and RdInv transactions in table 42). A probe coherency command may be a coherency command used to communicate the probe between nodes (e.g. the Kill and Flush coherency commands). Generally, a probe transaction may be initiated on the interconnect 22 in response to receiving a probe command in the node 10. The agent that initiated the RdExc(A) transaction that caused the second cRdExc(A) command detects a hit for the probe transaction on an outstanding RdExc(A) transaction, and responds to the probe transaction with an exclusive response (since the agent already has exclusive ownership by successfully transmitting the RdExc(A) transaction on the interconnect 22, even though the agent does not yet have a copy of the cache block A). The agent then becomes responsible for transferring data in response to the probe transaction. Thus, there is a data dependency between the probe transaction and the outstanding RdExc(A) transaction. The data dependency exists until the Fill command for the second cRdExc(A) command is provided and data is forwarded in response to the probe. If the assumption that the Flush(A) command is targeted at the second cRdExc(A) command is wrong, the dependency is false. Furthermore, if the dependency is false, a probe may be generated for the second cRdExc(A) (by the home node), and thus the probe transaction corresponding to the Flush(A) command may be dependent on another operation in the probe virtual channel (the probe generated for the second cRdExc(A) command). Additionally, that other operation arrives at the agent after the probe transaction corresponding to the Flush(A) command arrives. However, assuming that forward progress can still be made in the system, the false dependency eventually resolves.

Additionally, the memory bridge 32 may allocate resources in the Ack virtual channel for the WB(A) generated in response to the Flush(A) command. Since the data for the WB(A) command is not supplied until the Fill for the second cRdExc(A) command is provided, there is a data dependency between the Ack virtual channel and the CFill virtual channel. Furthermore, since it is possible that the second cRdExc(A) command has not even started yet (if the Flush(A) command is actually targeted at the first cRdExc(A) command), the data dependency translates to a dependency on the second cRdExc(A) command itself and is a false dependency. Thus, there is a data dependency of the Ack virtual channel on the CRd virtual channel (since the cRdExc command is in the CRd virtual channel). The CRd virtual channel also has a logical dependency on the Ack virtual channel (for returning responses to probes generated in response to a read), as indicated in FIG. 6 (blocks 130 and 126). Accordingly, Ack virtual channel resources may be needed to complete the cRdExc command, and thus there is a dependency of the WB(A) command on another operation in the Ack virtual channel. If the resources for the Ack virtual channel within a system including 2 or more nodes become filled with operations having the false dependency, deadlock may occur because forward progress is prevented. Similarly, if the snoop buffers in a processor become filled with false dependencies, forward progress may be prevented.

The example at the bottom of FIG. 7 is similar, using cRdShd commands to the cache block A with a silent drop in between and a Kill command from the home node while the second cRdShd command is outstanding. It is ambiguous whether the Kill(A) command is targeted at the first cRdShd(A) command or the second cRdShd(A) command, so the assumption is made that the Kill(A) command is targeted at the second cRdShd(A) command (so that the cache block is invalidated in the node if the assumption is correct). Since the cRdShd command is in the CRd virtual channel (similar to the cRdExc command) and the Kill command is in the probe virtual channel (similar to the Flush command), the same resource allocations in the memory bridge 32 and processors occur, and the same false dependency may occur.

To handle the false dependency, the node 10 may implement enough buffers (for the virtual channel that includes operations that may have the false dependency created in the ambiguous case) to handle the ambiguous cases which create the false dependencies, as well as at least one additional buffer that may be used for other cases which do not have a false dependency. The additional buffer(s) may be used repeatedly and freed (including being used for the operations on which the ambiguous cases depend) until the ambiguous cases complete, and thus deadlock may be avoided by permitting forward progress to continue until the ambiguous cases complete. Thus, combining the virtual channel containing the operations having the dependency and the virtual channel including the operations on which the dependency occurs may be performed without deadlock.

For example, each processor may have a finite number of RdExc transactions outstanding (e.g. equal to the number of read buffers in the processor). If each of these transactions experiences the ambiguous case mentioned above, then an equal number of snoop buffers (to the number of read buffers) may be occupied by snoops corresponding to the ambiguous case. By including at least one additional snoop buffer, the processor may permit additional snoops to occur and complete while the ambiguous cases remain outstanding. Similarly, the memory bridge 32 may have a finite number of cRdExc(A) coherency commands buffered (e.g. equal to the number of outgoing CRd buffers in the memory bridge 32), and thus having at least one more Ack buffer than CRd buffers in the memory bridge 32 may permit deadlock avoidance. These examples are described in more detail below.

Additionally, the L2 cache 36 may be involved in the ambiguous cases since the L2 cache 36 may retain the node state for remote cache blocks. Thus, if a RdExc transaction to a remote cache block is outstanding on the interconnect 22, the L2 cache 36 may have a write buffer allocated to update the cache memory with the remote cache block. In this case, the L2 cache 36 may invalidate the write buffer if a probe to the remote cache block is detected, effectively reusing the write buffer to invalidate the cache block in the L2 cache 36. Additionally, the L2 cache 36 may respond to the transaction by indicating a cache miss. The processor that initiated the RdExc transaction responds exclusive in this case, and may provide data. By responding miss, a read buffer to supply the cache block need not be allocated in the ambiguous case. Similarly, for the RdShd outstanding case, the L2 cache may invalidate the write buffer (that is to update the cache memory with the cache block in the shared state) and respond miss to the probe transaction. In this case, the memory bridge 32 may supply a false data on the interconnect 22 to complete the probe transaction, but the data is not used since there is no modified data to transfer back to the home node. Thus, additional buffers need not be provided in the L2 cache 36 for this embodiment.

The present description refers to transactions or coherency commands being "outstanding". A transaction may be outstanding if the address portion of the transaction has been transmitted on the interconnect 22, but the data portion of the transaction has not yet been transmitted. A coherency command may be outstanding if it has been generated by the memory bridge 32 (e.g. in response to a transaction) but not yet transmitted.

Figure 8:
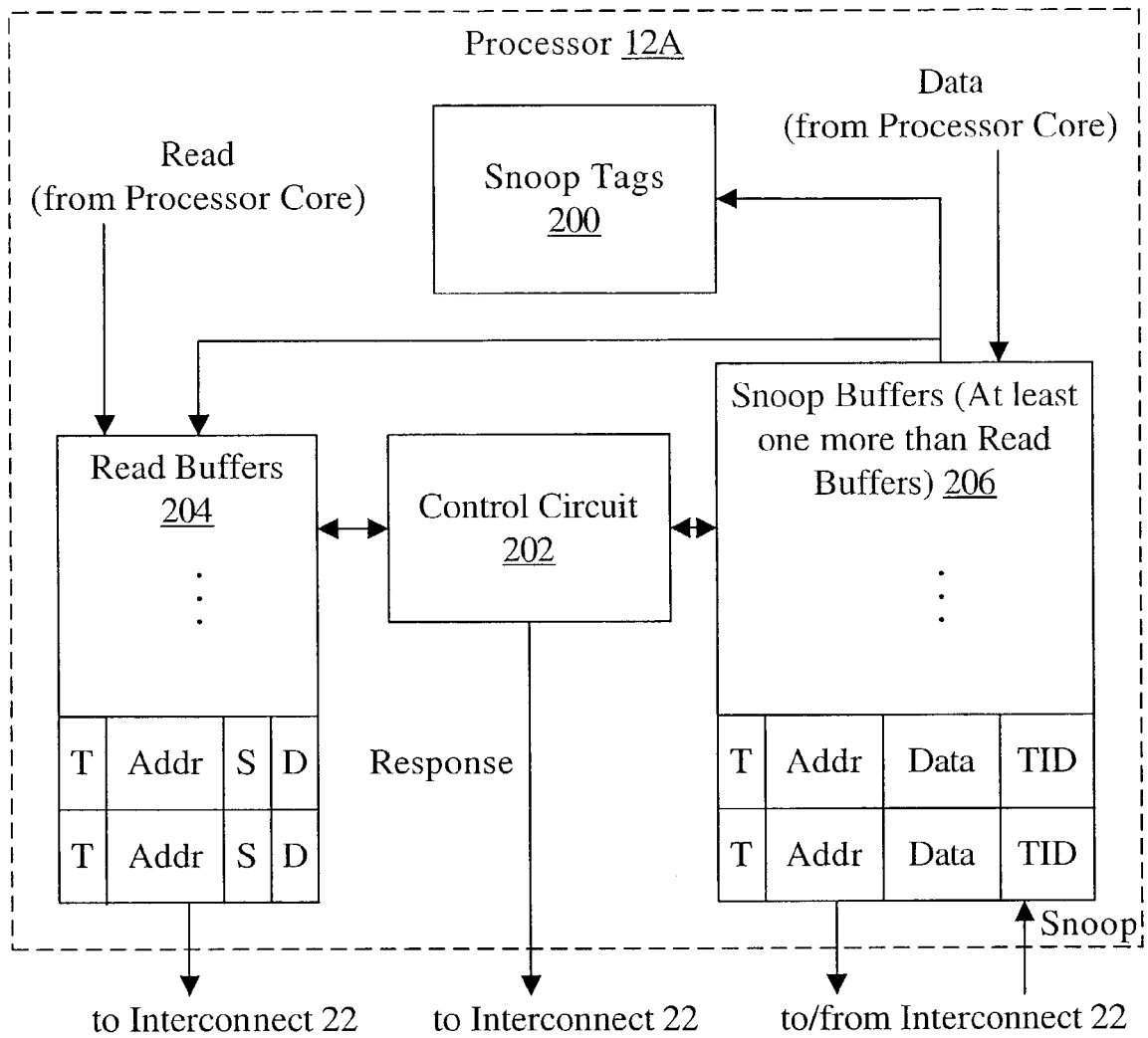
FIG. 8 is a block diagram of a portion of one embodiment of a processor shown in FIG. 1.

Turning now to FIG. 8, a block diagram of one embodiment of a portion of the processor 12A is shown. Other processors 12B–12N may be similar. In the embodiment of FIG. 8, the processor 12A includes a snoop tags memory 200, a snoop control circuit 202, one or more read buffers 204, and a plurality of snoop buffers 206. The read buffers 204 are coupled to receive read transactions from the processor core (not shown in FIG. 8), coupled to the snoop buffers 206, coupled to the snoop control circuit 202, and coupled to supply read transactions for transmission on the interconnect 22. The snoop buffers 206 are coupled to the snoop control circuit 202 and the snoop tags memory 200, coupled to receive data from the processor core, coupled to receive snoops from the interconnect 22, and coupled to supply data to the interconnect 22. As mentioned above, there is at least one more snoop buffer 206 than there are read buffers 204. That is, the number of snoop buffers 206 exceeds the number of read buffers 204.

Generally, the processor core inserts read transactions into the read buffers 204 in response to misses in a data cache within the processor core (not shown). The read transactions may be RdExc transactions if exclusive access is desired (e.g. to update the cache block with store data), or RdShd transactions if shared access is desired (e.g. to read the cache block for one or more load instructions). There may be one or more read buffers 204 in various embodiments, as desired. The control circuit 202 allocates a read buffer in the read buffers 204 to store a read transaction inserted by the processor core. Read transactions may be selected out of the read buffers 204 for transmission on the interconnect 22. The control circuit 202 may also deallocate read buffers as the read transactions stored therein are completed. The read transactions may belong to the CRd virtual channel, unless they are performed non-coherently.

Exemplary read buffer contents are illustrated for two of the read buffers 204. The contents may include, for example, a type field (T), an address field (Addr), a state field (S), and a dependency indication (D). The type field may indicate the type of read transaction (e.g. RdShd or RdExc, in this embodiment). The address field may store the address of the cache block accessed in response to the transaction. The state field may indicate whether or not the transaction is outstanding (e.g. whether or not the transaction has occurred on the interconnect 22), the snoop response received for the transaction, etc. The dependency indication may indicate whether or not a dependency has been detected for a snoop in one of the snoop buffers. The dependency indication may simply indicate the dependency (or lack thereof), or may also identify the snoop buffer containing the snoop for which the dependency is detected. Any other desired dependency information may also be stored, as desired. Any other read buffer contents that are desired may be included in various embodiments (e.g. transaction ID for the transaction, cache attributes, etc.).

The processor 12A may also snoop transactions initiated by other agents on the interconnect 22. For each snoop that occurs, the control circuit 202 may allocate a snoop buffer 206 and may snoop the processor 12A. In the present embodiment, the processor 12A implements the snoop tags memory 200. The snoop tags memory 200 stores tags of cache blocks that are cached in the processor core (e.g. in one or more data caches implemented in the processor core). Each tag includes the address of the cache block and indicates the state of the cache block in the processor core. In other embodiments, the processor core may be snooped directly. Additionally, transactions may be outstanding in the read buffers 204 (and thus the cache blocks accessed by the transactions may not yet be cached in the caches within the processor core). Accordingly, the read buffers are snooped as well. Depending on the results of the snoop, the control circuit 202 may generate a response to be transmitted on the interconnect 22 for the snooped transaction.

If the snoop hits modified (or exclusive, in one embodiment) in the processor core/read buffers 204, data comprising the cache block is supplied by the processor 12A in response to the snooped transaction. The snoop buffers 206 are coupled to receive the data from the processor core, and may supply the data for transmission on the interconnect 22. If the snoop does not hit modified (or exclusive), the control circuit 202 may free the snoop buffer corresponding to the snoop once the snoop response is determined and any internal state update has been made. If the snoop does hit modified (or exclusive), the snoop buffer may not be freed until the data is provided in response to the snooped transaction.

Exemplary snoop buffer contents are illustrated for two of the snoop buffers 206 in FIG. 8. The contents may include, for example, a type indication, an address field (Addr), a data field (Data), and a transaction identifier (TID). The type indication may indicate whether the snoop is a request for exclusive access (e.g. a RdExc, RdKill, or RdInv transaction) or shared access (e.g. a RdShd transaction). The address field may contain the address of the snoop transaction. The data field may store the data to be provided in response to the snoop transaction. The TID may identify the snoop transaction on the interconnect 22, and may be used to transmit the data if a snoop hit modified (or exclusive) is detected. Generally, the interconnect 22 may implement TIDs to link the address and data phases of transactions to each other, permitting out of order data phases with respect to the address phases. Other embodiments may include other contents as desired.

In the present embodiment, the snooped transactions may include probe transactions initiated by the memory bridge 32, as well as snooped local transactions initiated by other agents on the interconnect 22. Thus, the snoop buffers 206 are each configured to store operations belonging to the probe virtual channel (probe transactions). Additionally, the snoop buffers 206 are each configured to store snooped local transactions, in this embodiment. In the present embodiment, the probe transactions and local RdExc transactions are treated similarly: invalidation of the cache block in the processor 12A and transfer of the cache block in the data phase of the snooped transaction if the state (prior to invalidation) is modified or exclusive. For local RdShd transactions, the cache block may be changed to the shared state (if applicable) and may be transferred if the state (prior to being changed) is modified or exclusive. Other embodiments may include probe transactions that permit the cache block to remain shared, and such probe transactions may be treated similar to local RdShd transactions. While exclusive and modified are treated the same in this embodiment for snooping purposes (e.g. causing a transfer of the cache block from the processor 12A), other embodiments may only transfer the cache block if the cache block is in the modified state.

As mentioned above, the ambiguous case that may create the false dependency occurs for the processor 12A if a snoop hits an outstanding RdExc transaction in the read buffers 204 (that is, the address has been transmitted on the interconnect 22 but the data has not yet been received from the interconnect 22). The ambiguous case for the RdShd transaction may also occur in the processor 12A if the processor 12A retains the probe in the snoop buffers 206 to invalidate the cache block received in response to the RdShd transaction. At most, the ambiguous case may occur once for each of the read buffers 204 (and a corresponding snoop buffer 206). Thus, at least one snoop buffer may be used to make forward progress even if each read buffer 204 is stalled with the ambiguous case.

Figure 9:
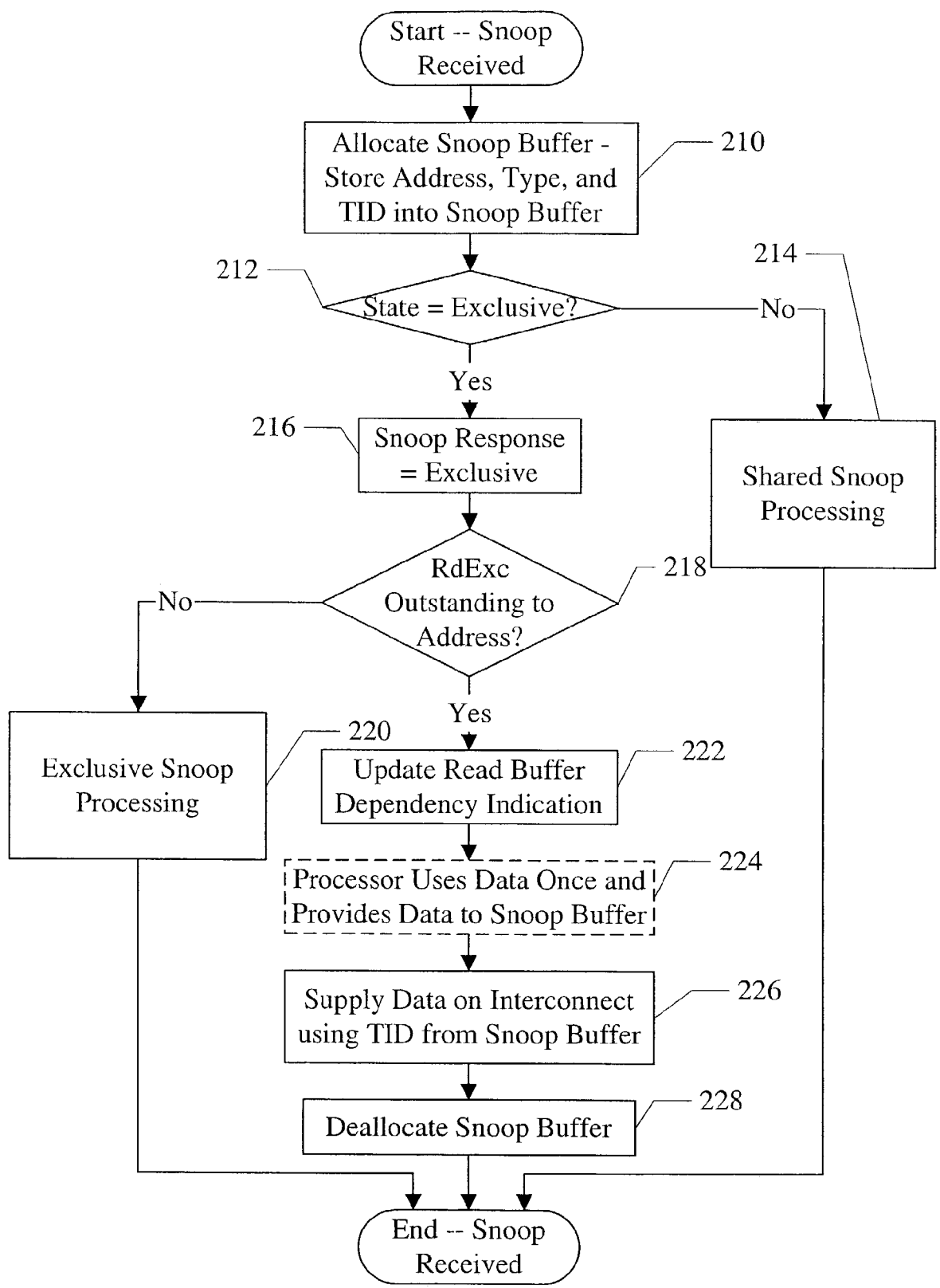
FIG. 9 is a flowchart illustrating operation of one embodiment of a control circuit shown in FIG. 8 in response to a snoop.

It is noted that, while the embodiment of the processor 12A shown in FIG. 9 records the dependency of the snoop on the read transaction in the read buffers 204 and the processor core supplies the cache block to the snoop buffers 206 to satisfy the dependency, other embodiments may be implemented in other fashions. For example, the dependency may be recorded in the snoop buffers 206. The read transaction on which the snoop depends may complete normally, storing the cache block in the cache (and in the case of the read exclusive, permitting at least one update of the cache block). The snoop buffer 206 may then transmit the dependent snoop to the processor core cache to invalidate the cache block and retrieve the cache block data for transmission as the data phase of the snooped transaction.

It is noted that, in various embodiments, the processor 12A may include various logic circuitry for interfacing with the interconnect 22 and/or temporary buffering to and from the interconnect 22, not shown in FIG. 8. It is further noted that, while snooping is illustrated occurring from the snoop buffers 206, a snoop may be performed in parallel with allocation of the snoop buffer.

FIG. 9 is a flowchart illustrating operation of one embodiment of the control circuit 202 in response to a snoop being received by the processor 12A (that is, in response to a coherent transaction being performed by another agent on the interconnect 22). While the blocks are shown in FIG. 9 in a particular order for ease of understanding, other orders may be used. Furthermore, blocks may be performed in parallel by combinatorial logic in the control circuit 202. Blocks may be performed over multiple clock cycles in a pipelined fashion.

The control circuit 202 allocates a snoop buffer for the snooped transaction (block 210). The control circuit 202 may cause the address of the snoop, the type, and the TID of the snooped transaction to be stored in the snoop buffer.

The state of the cache block affected by the snoop is determined. If the state is not exclusive (which includes both exclusive and modified for this embodiment) (decision block 212, "no" leg), the control circuit 202 performs shared snoop processing (e.g. the shared snoop response is provided and the cache block is invalidated or remains shared, depending on the snoop type) (block 214).

If the state is exclusive (decision block 212, "yes" leg), the control circuit 202 may generate an exclusive response for the snooped transaction (block 216). The state may be exclusive in the caches (as indicated by the snoop tags memory 200) or in the read buffers 204 (if a RdExc transaction is outstanding to the address of the snooped transaction). If a RdExc transaction is not outstanding to the address of the snooped transaction (decision block 218, "no" leg), the control circuit 202 performs exclusive snoop processing (e.g. providing the data from the processor core caches on the interconnect 22 with the TID from the snoop buffer and invalidating the cache block in the caches) (block 220).

If a RdExc transaction is outstanding to the address of the snooped transaction (decision block 218, "yes" leg), the control circuit 202 may update the dependency indication in the read buffer storing the RdExc transaction to indicate the dependency (block 222). At some later point, the data is provided for the RdExc transaction. The processor 12A may use the data once and then provide the data back to the snoop buffer 206 corresponding to the snooped transaction (block 224). The control circuit 202 causes the snoop buffer 206 to supply the data and the TID for transmission on the interconnect 22 (block 226), and the snoop buffer is then deallocated (block 228).

It is noted that, once an outstanding RdExc transaction has been snoop hit, the state of the transaction may no longer be exclusive. Thus, the decision block 218 may represent detecting a RdExc transaction as outstanding in a given read buffer if the transaction is outstanding and the dependency indication in the given read buffer does not indicate a dependent snoop has been detected.

It is noted that other agents on the interconnect 22 (e.g. other processors 12B–12N or an I/O bridge that performs coherent transactions) may be similar to the processor 12A as described above with regard to FIGS. 8–9.

Figure 10:
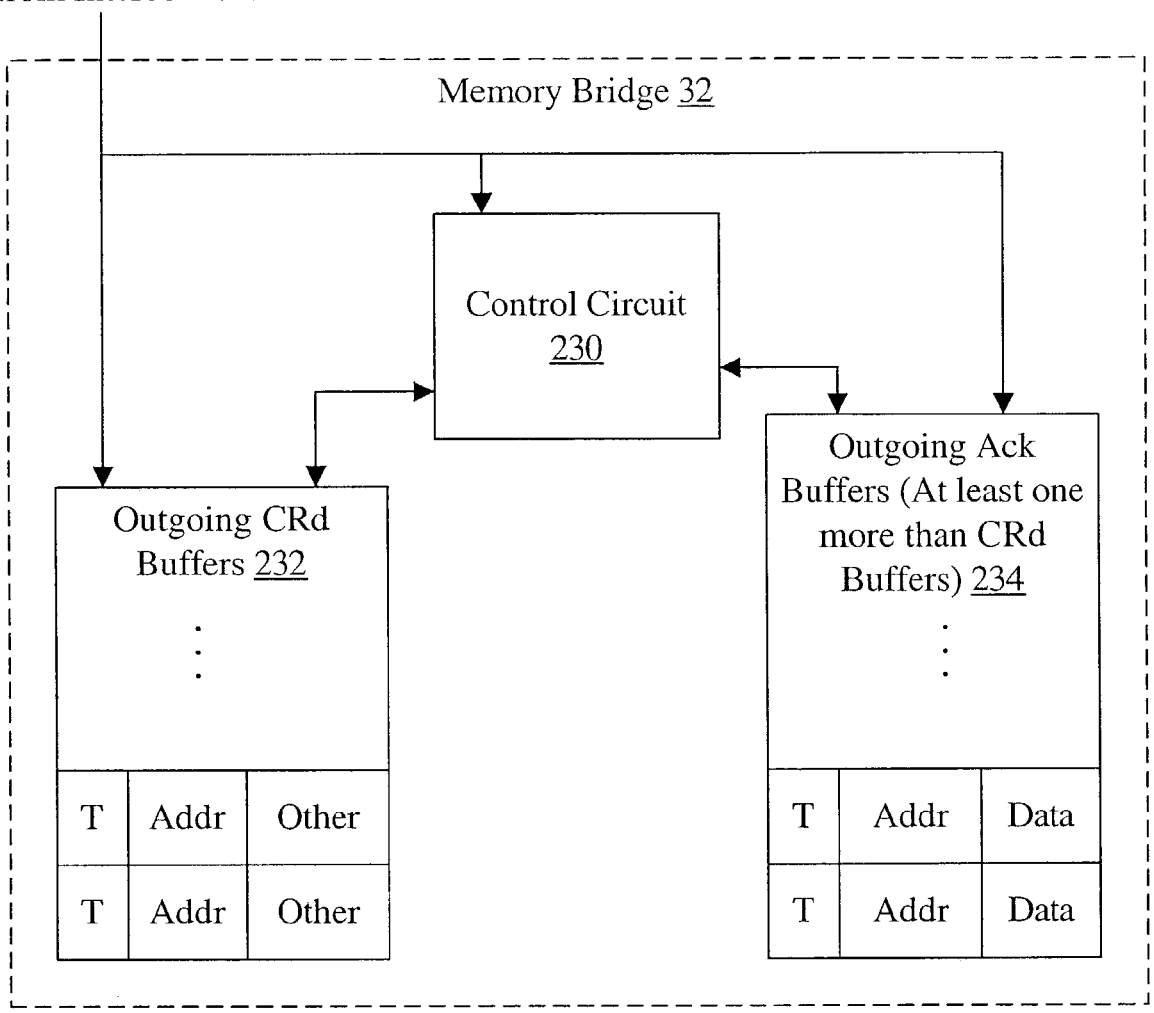
FIG. 10 is a block diagram of a portion of one embodiment of a memory bridge shown in FIG. 1.

Turning now to FIG. 10, a block diagram of a portion of one embodiment of the memory bridge 32 is shown. In the embodiment of FIG. 10, the memory bridge includes a control circuit 230, one or more outgoing CRd buffers 232, and a plurality of outgoing Ack buffers 234. As illustrated in FIG. 10, there is at least one more Ack buffer 234 than there is CRd buffers 232. That is, a number of the Ack buffers 234 exceeds the number of CRd buffers 232. The control circuit 230 is coupled to the CRd buffers 232 and the Ack buffers 234. Additionally, the control circuit 230, the CRd buffers 232, and the Ack buffers 234 are coupled to receive information from the interconnect 22.

The CRd buffers 232 store operations belonging to the CRd virtual channel. In the present embodiment, the operations comprise coherent read commands generated in response to remote read transactions on the interconnect 22. For example, the coherent read commands may cRdExc and cRdShd coherency commands, in the present embodiment. A remote read transaction is a read transaction to a remote cache block. The CRd buffers 232 are referred to as "outgoing" because the coherent read commands stored therein are to be transmitted out of the node 10 to the home node of the affected cache blocks. Other buffers, not shown, are used to store "incoming" operations in the CRd virtual channel (e.g. coherent read commands) received from the interfaces 30A–30C (for which the node 10 is the home node). The CRd buffers 232 may receive the address of remote read transactions from the interconnect 22, as well as the type of read transaction. The control circuit 230 allocates one of the CRd buffers 232 to store the coherent read command, and deallocates the buffer once the coherent read command is sent to one of the interface circuits 20A–20C for transmission out of the node 10.

Exemplary contents of two of the CRd buffers 232 are shown in FIG. 10. Other contents may be included in various embodiments as well, as desired. The contents of each buffer may include a type field (T) indicating the type of coherent read command, an address field (Addr) storing the address of the coherent read command, and any other desired information (Other).

The Ack buffers 234 store operations belonging to the Ack virtual channel. In the present embodiment, for example, the Ack buffers 234 may store Kill_Ack coherency commands and WB coherency commands. A Kill_Ack coherency command is generated in response to a Kill probe being transmitted on the interconnect 22 by the memory bridge 32 (as a RdKill transaction, in the present embodiment). The Kill probe is received by the node 10 from another node, and the Kill_Ack coherency command is stored in the Ack buffers 234 for transmission out of the node 10 (to the node that transmitted the Kill probe). A WB coherency command may be generated in response to any probe (Kill or Flush) which results in an exclusive response on the interconnect 22, to transmit the affected cache block out of the node 10. Thus, similar to the CRd buffers 232, the Ack buffers 234 are referred to as "outgoing". Other Ack buffers (not shown in FIG. 10) may be used for incoming operations in the Ack virtual channel. In the present embodiment, the control circuit 230 may allocate one Ack Buffer 234 for each probe, which may store a Kill_Ack, and WB, or both. In other embodiments, a buffer may be used for each of the Kill_Ack and WB commands, and thus the control circuit 230 may allocate one or two Ack buffers 234 depending on the possible responses to the probe command being issued on the interconnect 22. In such embodiments, there may be at least two more Ack buffers 234 than there are CRd buffers 232. The control circuit 230 allocates an Ack buffer 234 in response to a probe being placed on the interconnect 22. The control circuit 230 deallocates the Ack buffer responsive to transmitting the coherency commands therein or, in the case of a WB coherency command, in response to a non-exclusive response on the interconnect 22 to the probe.

More particularly, a Kill probe results in a Kill_Ack coherency command, and may also result in a WB coherency command. The Kill_Ack coherency command may be transmitted out of the node 10 at any time after the corresponding Kill probe is initiated on the interconnect 22 (as a RdKill transaction). However, if a response of exclusive is received for the probe transaction on the interconnect 22, then a WB coherency command is also generated. Such a response may occur, for example, if a RdExc transaction has been previously initiated on the interconnect 22 but the corresponding cRdExc coherency command has not yet reached the home node (or has been ordered behind the command that caused the Kill probe to be transmitted). However, since the agent that initiated the RdExc transaction has been probed and will transmit the cache block in response to the probe, the memory bridge 32 accepts the cache block and returns it to the home node.

Exemplary contents of two of the Ack buffers 234 are illustrated in FIG. 10. Additional contents may be provided in various embodiments, as desired. Each Ack buffer may include a type field (T) indicating the type of coherency command (Kill_Ack or WB or both), an address field (Addr) storing the address of the affected cache block, and a data field (Data) storing the data comprising the cache block (for WB coherency commands).

As mentioned above, the ambiguous case occurs if a probe is transmitted on the interconnect 22 by the memory bridge 32 and a coherent read command (cRdExc or cRd-Shd) is queued in the CRd buffers 232 for the same cache block as affected by the probe. Thus, the ambiguous case may occur, at most, once for each CRd buffer 232. By including at least one more Ack buffer 234 than CRd buffers 232, at least one Ack buffer 234 may be used to make forward progress even if the maximum number of ambiguous cases exist.

It is noted that, in various embodiments, the memory bridge 32 may include various logic circuitry for interfacing with the interconnect 22 and/or temporary buffering to and from the interconnect 22, not shown in FIG. 10. Similarly, various logic circuitry and/or temporary buffering may be included in the memory bridge 32 for interfacing with the switch 18.

Figure 11:
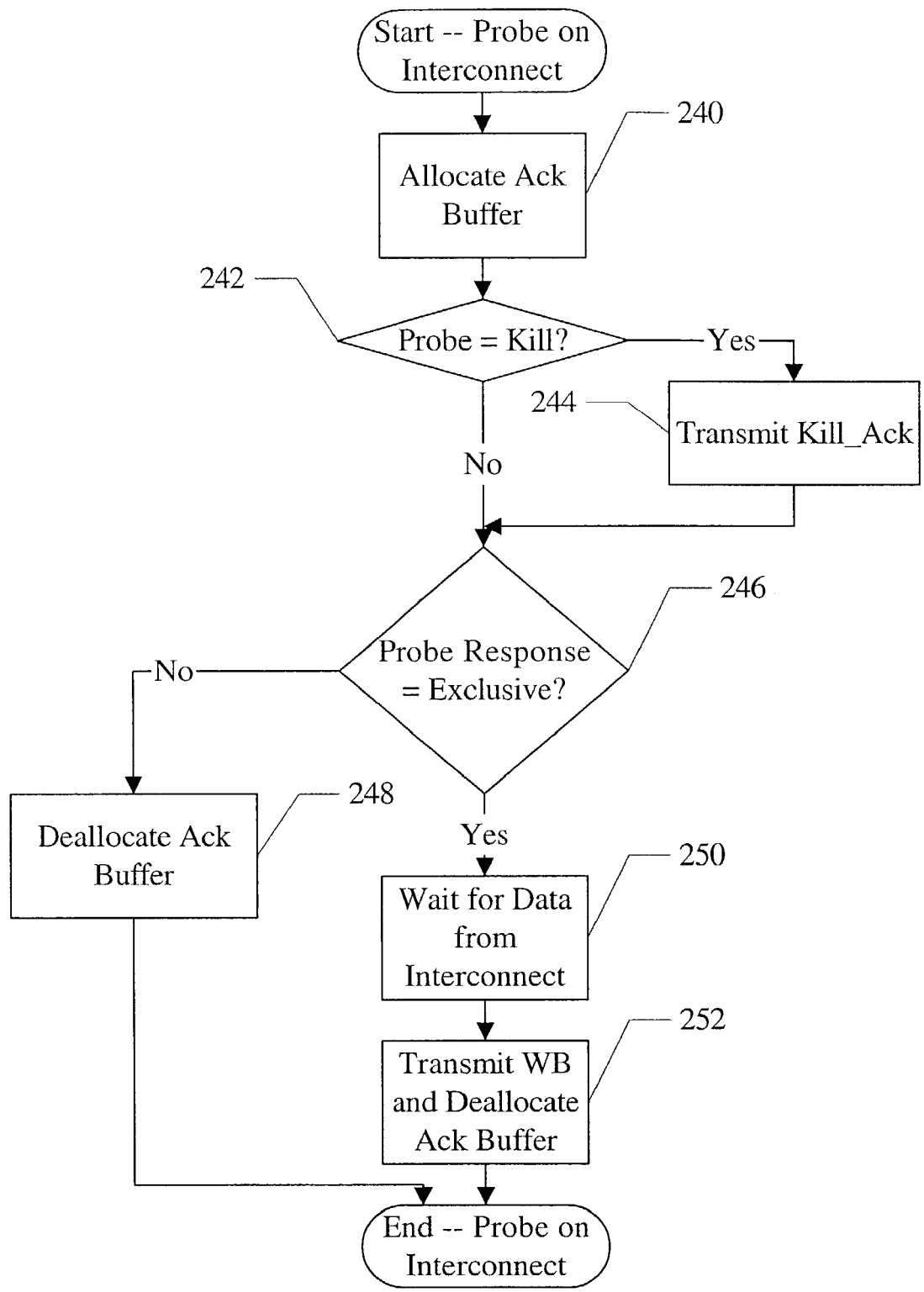
FIG. 11 is a flowchart illustrating operation of one embodiment a control circuit shown in FIG. 10.

Turning next to FIG. 11, a flowchart is shown illustrating operation of one embodiment of the control circuit 230 in response to the memory bridge 32 transmitting a probe transaction on the interconnect 22. The probe transaction may be transmitted by the memory bridge 32 in response to receiving a probe coherency command, as described above. While the blocks are shown in FIG. 11 in a particular order for ease of understanding, other orders may be used. Furthermore, blocks may be performed in parallel by combinatorial logic in the control circuit 230. Blocks may be performed over multiple clock cycles in a pipelined fashion.

In response to transmitting the probe transaction on the interconnect 22, the control circuit 230 allocates an Ack buffer 234 (block 240). In the present embodiment, the Ack buffer 234 may store a Kill_Ack coherency command, a WB coherency command, or both.

If the probe is a Kill, the Kill_Ack coherency command may be transmitted at any time. This action is represented in the flowchart of FIG. 11 with the decision block 242 and the block 244. This action may be independent of the other activities in the flowchart, and may be performed in parallel. However, the Ack buffer may not be freed (block 248 or 252) until the Kill_Ack command has been transmitted.

The control circuit 230 senses the probe response to the probe on the interconnect 22 (decision block 246). If the probe response is not exclusive, than a WB coherency command is not needed (decision block 246, "no" leg). In this case (assuming the Kill_Ack coherency command has been transmitted, as mentioned above) the control circuit 230 may deallocate the Ack buffer 234 (block 248).

If the probe response is exclusive (decision block 246, "yes" leg), the control circuit 230 may wait for the data provided on the interconnect 22 in the data phase of the probe transaction (block 250). The control circuit 230 may store the data in the Ack buffer 234. The WB coherency command may be sent to one of the interface circuits 20A–20C for transmission out of the node 10, and then the Ack buffer 234 may be deallocated (block 252).

Figure 12:
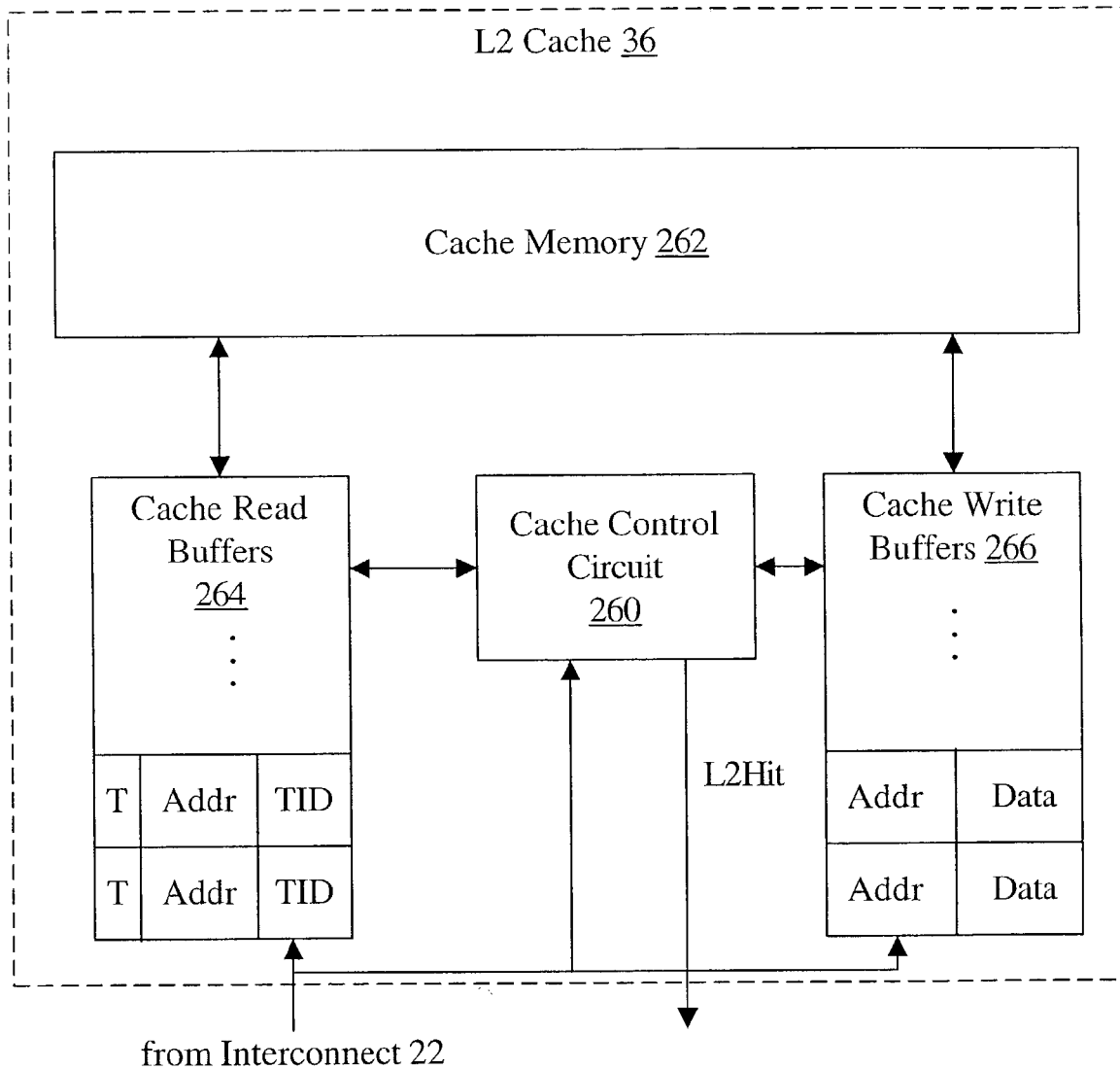
FIG. 12 is a block diagram of one embodiment of a portion of the L2 cache shown in FIG. 1.

Turning next to FIG. 12, a block diagram of a portion of one embodiment of the L2 cache 36 is shown. In the embodiment of FIG. 12, the L2 cache 36 includes a cache control circuit 260, a cache memory 262, a set of one or more cache read buffers 264, and a set of one or more cache write buffers 266. The cache memory 262 is coupled to the cache read buffers 264 and the cache write buffers 266. The cache control circuit 260 is also coupled to the cache read buffers 264 and the cache write buffers 266, and is further coupled to receive information from the interconnect 22 and to supply a hit/miss indication (L2Hit). The cache read buffers 264 and cache write buffers 266 are coupled to receive information from the interconnect 22 as well.

The cache memory 262 may include storage for cache blocks of data, as well as tags. The tags may indicate the address of the cache block, and may include state information (e.g. the MESI state of the cache block in the L2 cache 36). Generally, the cache read buffers 264 are used to store read operations for the cache memory 262, and the cache write buffers 266 are used to store write operations for the cache memory 262. That is, "read" and "write" in the context of the buffers 264 and 266 refers to the operation performed on the cache memory 262. Various transactions on the interconnect 22 may generate a read operation, a write operation, or both. For example, a read operation may be used to determine if the transaction is a hit in the cache memory 262, and to retrieve the data from the cache memory 262 if a hit is detected. A read operation may be used to read an evicted cache block from the cache memory 262 if the cache block is dirty, to write the cache block back to memory (or to the memory bridge 32, if the cache block is a remote cache block). A write operation may be used to store a cache block in the cache memory 262, or to update the MESI state of the cache block in the cache memory 262.

The cache control circuit 260 may allocate a cache read buffer 264 and/or a cache write buffer 266 to each transaction, and information from the transaction may be stored into the allocated buffer. For example, exemplary contents of two cache read buffers 264 and cache write buffers 266 are illustrated in FIG. 12. Other embodiments may include additional contents, as desired. Each cache read buffer 264 may include a type field (T) indicating the type of transaction corresponding to the read, an address field to store the address of the transaction, and a TID field for the transaction ID of the transaction (used to identify the data if a cache hit is detected for the read and the data is transmitted by the L2 cache 36 on the interconnect 22). Each cache write buffer 266 may include an address field identifying the address of the cache block, and a data field comprising the data to be written to the cache memory 260. The data may include cache block data and/or tag data, such as the MESI state to be stored in the cache memory 260. The cache control circuit 260 deallocates a cache read buffer 264 in response to performing the read and, if data is to be transmitted on the interconnect 22 in response to the read, in response to transmitting the data on the interconnect 22. The cache control circuit 260 deallocates a cache write buffer 266 in response to performing the write to the cache memory 262.

As mentioned above, the ambiguous case may occur if a remote read transaction is outstanding at the time a probe occurs to the same cache block as the remote read transaction. If a remote read exclusive transaction is outstanding, then a cache write buffer 266 has been allocated to store the remote cache block in the L2 cache 36 with a modified state. If a probe is received which hits the write buffer, the cache control circuit 260 may modify the state portion of the data to be written to the cache memory 262 to the invalid state. Additionally, since a processor or other agent also has the remote read exclusive transaction outstanding at the same time, the cache control circuit 260 may cause the L2 cache 36 to respond miss to the probe transaction on the interconnect 22. The agent that initiated the remote read exclusive transaction may respond exclusive and may supply the data for the probe, as discussed above with regard to the processor 12A. Similarly, if a remote read shared transaction is outstanding, no data need be supplied in response to the probe. The L2 cache 36 may respond miss in this case as well.

In the above manner, the cache control circuit 260 may avoid allocating a cache read buffer 264 (for a snoop of the cache memory 262 and possible return of data) or a cache write buffer 264 (for an update of the cache memory 262) in the ambiguous cases. Thus, no dependencies may be created in the L2 cache 36 in the ambiguous case, and deadlock may be avoided.

It is noted that, in various embodiments, the L2 cache 36 may include various logic circuitry for interfacing with the interconnect 22 and/or temporary buffering to and from the interconnect 22, not shown in FIG. 12.

Figure 13:
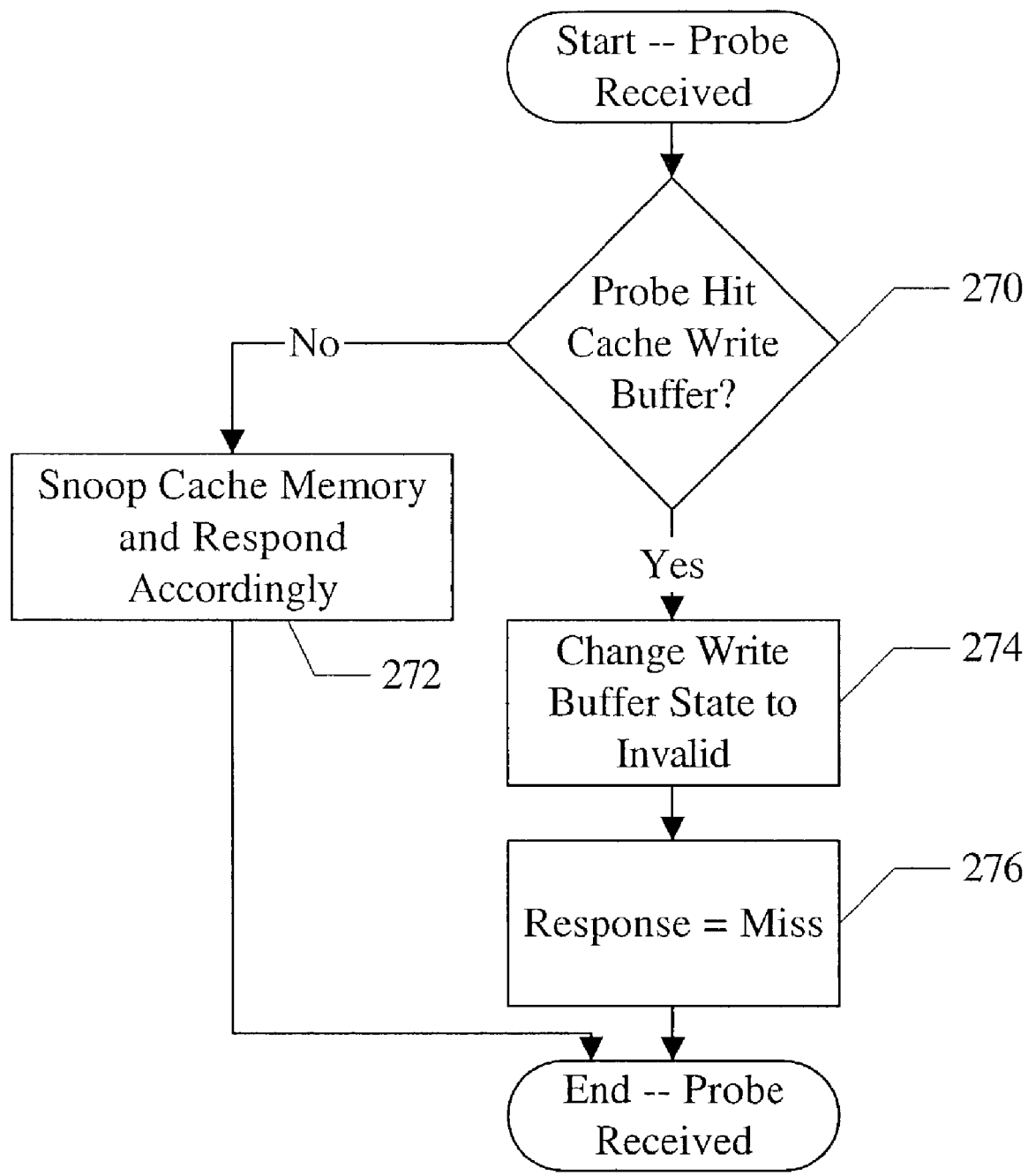
FIG. 13 is a flowchart illustrating operation of one embodiment of a control circuit shown in FIG. 12 in response to a probe.

Turning next to FIG. 13, a flowchart is shown illustrating operation of one embodiment of the control circuit 260 in response to receiving a probe transaction from the interconnect 22. While the blocks are shown in FIG. 13 in a particular order for ease of understanding, other orders may be used. Furthermore, blocks may be performed in parallel by combinatorial logic in the control circuit 260. Blocks may be performed over multiple clock cycles in a pipelined fashion.

The control circuit 260 determines if the probe transaction hits in a cache write buffer 266 (decision block 270). That is, the control circuit 260 determines if the probe transaction identifies a same cache block as the write in the cache write buffer 266 (e.g. by comparing the address in the cache write buffer 266 to the address of the probe transaction). If the probe transaction does not hit the cache write buffer (decision block 270, "no" leg), the cache control circuit 260 may snoop the cache memory 262 (allocating a read buffer 264 for the purpose) and respond accordingly (block 272). On the other hand, if the probe transaction does hit a cache write buffer 266 (decision block 270, "yes" leg), the control circuit 260 changes the state of the cache block in the write buffer 266 to invalid (block 274). Additionally, the control circuit 260 generates a miss response for the probe transaction (block 276).

It is noted that, in one embodiment, flow control may be implemented on the interconnect 22 using a set of block signals. Each agent may have one or more block signals, and may indicate its ability to accept certain transactions using the block signals. If a block signal is asserted, then the agent may be indicating that it may not access transactions of the type(s) indicated by that block signal. An agent preparing to source a transaction on the interconnect 22 may check the block signals of agents that would participate in that transaction to determine if the transaction may be initiated. In one implementation, the processors 12A–12N may each implement a block signal, and may assert the block signal if its snoop buffers are full. In the implementation, the L2 cache 36 may implement a first block signal used for probes (used by the memory bridge 32), a second block signal for CRd requests, and for non-posted and posted HT commands, by the memory bridge 32, and a third block signal for other requests. The cache read and write buffers may be implemented as pools of buffers that may be used for any of the three types of transactions represented by the three block signals, with at least one buffer reserved for each block signal. In the implementation, the memory bridge 32 may implement a separate block signal for each outgoing virtual channel.

Computer Accessible Medium

Figure 14:
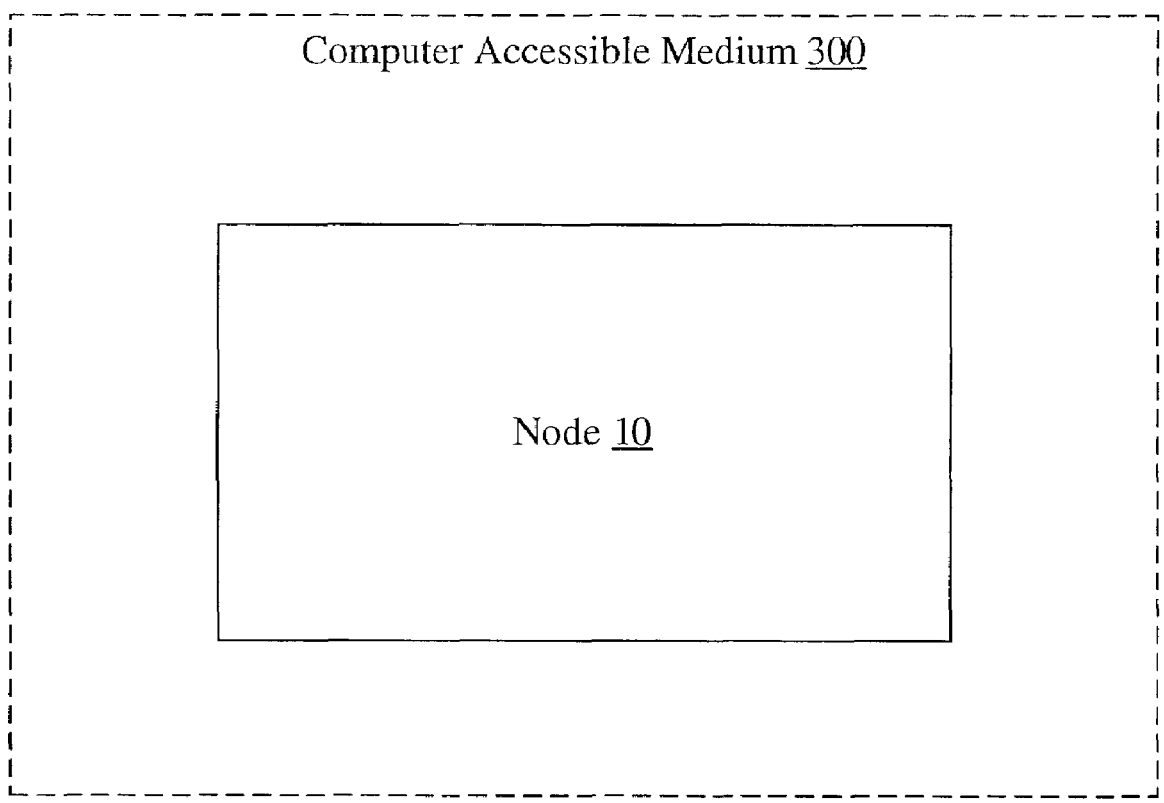
FIG. 14 is a block diagram of one embodiment of a computer accessible medium.

Turning next to FIG. 14, a block diagram of a computer accessible medium 300 including one or more data structures representative of the circuitry included in the node 10 is shown. Generally speaking, a computer accessible medium may include storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer accessible medium 300 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium 300 may be the netlist(s) (with or without the synthesis library) or the data set(s), as desired. In yet another alternative, the data structures may comprise the output of a schematic program, or netlist(s) or data set(s) derived therefrom.

While computer accessible medium 300 includes a representation of the node 10, other embodiments may include a representation of any portion of the node 10 (e.g. processors 12A–12N, memory controller 14, L2 cache 36, interconnect 22, memory bridge 32, remote line directory 34, switch 18, interface circuits 22A–22C, etc.).

Numerous variations and modifications will become apparent to those skilled in the art once the above disclosure is fully appreciated. It is intended that the following claims be interpreted to embrace all such variations and modifications.

What is claimed is:

1. An apparatus comprising:
    a first plurality of buffers configured to store operations belonging to a first virtual channel during use, the first virtual channel including first operations and second operations, wherein at least one of the first operations depends on at least one of the second operations during use, and wherein a first number of the first operations to be in execution is less than or equal to a maximum number of operations; and
    a control circuit coupled to the first plurality of buffers and configured to control allocation and deallocation of the first plurality of buffers;
    wherein it is ambiguous, for a first received operation in the first virtual channel, whether the first received operation is one of the first operations or the second operations, and wherein a total number of the first plurality of buffers exceeds a number corresponding to the maximum number of operations.

2. The apparatus as recited in claim 1 wherein at least one of the first operations is falsely dependent on one or more second operations.

3. The apparatus as recited in claim 1 further comprising a second one or more buffers configured to store operations belonging to a second virtual channel during use, and wherein the control circuit is coupled to the second one or more buffers and is configured to control allocation and deallocation of the second one or more buffers, and wherein, in at least some cases, one of the first operations in the first virtual channel is dependent on a third operation in the second virtual channel, and wherein the third operation is further dependent on one of the second operations in the first virtual channel, whereby the one of the first operations is dependent on the one of the second operations, and wherein the maximum is a number of the second one or more buffers.

4. The apparatus as recited in claim 3 wherein the apparatus is implemented in a processor, and wherein the first plurality of buffers are snoop buffers, and wherein the second buffers are one or more read buffers.

5. The apparatus as recited in claim 4 wherein the processor is configured to insert read transactions in the second buffers for transmission on an interconnect to which the processor is coupled.

6. The apparatus as recited in claim 5 wherein the dependency occurs if a first read transaction in one of the second buffers is initiated on the interconnect but a data transfer for the first read transaction has not yet occurred on the interconnect, and a probe addressing a same cache block as the first read transaction is received from the interconnect into one of the first plurality of buffers.

7. The apparatus as recited in claim 6 wherein the dependency is a data dependency.

8. The apparatus as recited in claim 7 wherein the dependency is satisfied by the processor providing the cache block received in response to the first read transaction, after at least one use by the processor, as the data in response to the probe.

9. The apparatus as recited in claim 3 wherein the apparatus is implemented in a memory bridge that is responsible for internode coherency within a node, and wherein the first plurality of buffers are assigned to an acknowledge virtual channel that includes acknowledge coherency commands and writeback coherency commands, and wherein the second buffers are assigned to a coherent read virtual channel that includes coherent read commands.

10. The apparatus as recited in claim 9 wherein the memory bridge is configured to insert coherent read coherency commands into the second buffers in response to remote read transactions on the interconnect within the node.

11. The apparatus as recited in claim 10 wherein the dependency occurs if a first read coherency command is outstanding in the second buffers and a probe on the interconnect causes a writeback of a same cache block as addressed by the first read coherency command.

12. The apparatus as recited in claim 11 wherein the dependency is a data dependency.

13. A processor comprising:
    a plurality of snoop buffers, each of the plurality of snoop buffers configured to store a probe from a probe virtual channel during use, wherein a first probe has a transaction dependency on a second probe;
    one or more read buffers, each of the read buffers configured to store a read transaction generated by the processor for transmission on an interconnect to which the processor is coupled during use, wherein the first probe has a dependency on one of the read transactions in the one or more read buffers, in which the dependency on the second probe is generated; and
    a control circuit coupled to the plurality of snoop buffers and the read buffers, wherein the control circuit is configured to allocate and deallocate the plurality of snoop buffers and the read buffers;
    wherein the plurality of snoop buffers numbers at least one more than the read buffers.

14. The processor as recited in claim 13 wherein each of the plurality of snoop buffers is further configured to store a snoop from the interconnect during use.

15. The processor as recited in claim 13 wherein if the first probe hits a first read transaction in one of the read buffers and the first read transaction has been initiated on the interconnect but has not had a data transfer on the interconnect, the processor is configured to use a cache block received in response to the first read transaction at least once and then provide the cache block in response to the first probe.

16. A memory bridge comprising:
    one or more coherent read buffers, wherein each of the coherent read buffers is configured to store a coherent read coherency command for transmission out of a node including the memory bridge;
    a plurality of acknowledge buffers, wherein each of the plurality of acknowledge buffers is configured to store an acknowledge coherency command or a writeback coherency command for transmission out of the node, at least some of the writeback coherency commands in the plurality of acknowledge buffers having a dependency on one of the coherent read commands, and at least some of the dependencies causing a second dependency on a command in one of the plurality of acknowledge buffers;
    a control circuit coupled to the coherent read buffers and the plurality of acknowledge buffers, wherein the control circuit is configured to control allocation and deallocation of the coherent read buffers and the plurality of acknowledge buffers;

wherein the plurality of acknowledge buffers numbers at least one more than the coherent read buffers.

17. The memory bridge as recited in claim 16, wherein the memory bridge is configured to insert coherent read coherency commands in the plurality of coherent read buffers in response to remote read transactions on an interconnect within the node to which the memory bridge is coupled.

18. A method comprising:

merging a first virtual channel to which first operations belong with a second virtual channel to which second operations belong to create a merged virtual channel, wherein at least some of the first operations have a dependency on one or more of the second operations during use, wherein a number of the first operations having the dependency is less than or equal to a maximum number of operations to be in execution, and wherein it is ambiguous whether a received operation in the merged virtual is one of the first operations or the second operations; and providing a number of buffers for the merged virtual channel, the number of buffers exceeding a number corresponding to the maximum number of operations.

19. The method as recited in claim 18, wherein at least some of the dependencies of the first operations on the second operations are false dependencies.

* * * * *

UNITED STATES PATENT AND TRADEMARK OFFICE
CERTIFICATE OF CORRECTION

PATENT NO. : 7,114,043 B2  Page 1 of 1
APPLICATION NO. : 10/434921
DATED : September 26, 2006
INVENTOR(S) : Joseph Rowlands It is certified that error appears in the above-identified patent and that said Letters Patent is hereby corrected as shown below:

Column 30, line 40, in Claim 15: insert a comma after "wherein"

Signed and Sealed this

Twenty-third Day of December, 2008

JON W. DUDAS
*Director of the United States Patent and Trademark Office*